(12) United States Patent
Vibhor et al.

(10) Patent No.: US 11,695,831 B2
(45) Date of Patent: *Jul. 4, 2023

(54) GEO-LOCATION-BASED DATA REPLICATION

(71) Applicant: Commvault Systems, Inc., Tinton Falls, NJ (US)

(72) Inventors: Anand Vibhor, Manalapan, NJ (US); Mrityunjay Upadhyay, Telengana (IN); Bhavyan Bharatkumar Mehta, Mumbai (IN)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,156

(22) Filed: Mar. 25, 2022

(65) Prior Publication Data
US 2022/0239740 A1 Jul. 28, 2022

Related U.S. Application Data

(63) Continuation of application No. 17/196,847, filed on Mar. 9, 2021, now Pat. No. 11,323,513.
(Continued)

(51) Int. Cl.
*H04L 67/1095* (2022.01)
*H04L 67/1097* (2022.01)
(Continued)

(52) U.S. Cl.
CPC ........ *H04L 67/1095* (2013.01); *G06F 18/214* (2023.01); *G06N 7/01* (2023.01);
(Continued)

(58) Field of Classification Search
CPC .... H04L 67/1095; H04L 67/52; G06F 16/178
See application file for complete search history.

(56) References Cited

U.S. PATENT DOCUMENTS

| 4,084,231 A | 4/1978 | Capozzi et al. |
| 4,267,568 A | 5/1981 | Dechant et al. |
(Continued)

FOREIGN PATENT DOCUMENTS

| EP | 0259912 | 3/1988 |
| EP | 0405926 | 1/1991 |
(Continued)

OTHER PUBLICATIONS

Arneson, "Mass Storage Archiving in Network Environments" IEEE, Oct. 31-Nov. 1998, pp. 45-50.
(Continued)

*Primary Examiner* — Caroline H Jahnige
(74) *Attorney, Agent, or Firm* — Commvault Systems, Inc.

(57) ABSTRACT

A system or method for managing an auxiliary data location and a secondary data location. A client computing device may have secondary copies of its primary data stored at a secondary storage device, as well as auxiliary copies of the secondary copies at an auxiliary storage device. The client computing device may move from one geographic location that is near the secondary storage device to a second geographic location that is far from the secondary storage device, but closer to the auxiliary storage device. A method is provided with input signals in response to the move, and outputs a probability value that the move is temporary or permanent. Based on the output, a storage manager that manages the client computing device may then direct the client computing device to use the auxiliary storage device for storing secondary copies.

22 Claims, 18 Drawing Sheets

Related U.S. Application Data

(60) Provisional application No. 63/140,648, filed on Jan. 22, 2021.

(51) Int. Cl.
  *G06N 20/00* (2019.01)
  *H04L 67/52* (2022.01)
  *G06F 18/214* (2023.01)
  *G06N 7/01* (2023.01)

(52) U.S. Cl.
  CPC .......... *G06N 20/00* (2019.01); *H04L 67/1097* (2013.01); *H04L 67/52* (2022.05)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 8,170,995 B2 | 5/2012 | Prahlad et al. |
| 8,229,954 B2 | 7/2012 | Kottomtharayil et al. |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,578,120 B2 | 11/2013 | Attarde et al. |
| 8,954,446 B2 | 2/2015 | Vijayan Retnamma et al. |
| 9,020,900 B2 | 4/2015 | Vijayan Retnamma et al. |
| 9,098,495 B2 | 8/2015 | Gokhale |
| 9,152,686 B2 | 10/2015 | Whitehead et al. |
| 9,239,687 B2 | 1/2016 | Vijayan et al. |
| 9,633,033 B2 | 4/2017 | Vijayan et al. |
| 9,639,274 B2 | 5/2017 | Maranna et al. |
| 10,831,778 B2 | 11/2020 | Gokhale et al. |
| 2006/0224846 A1 | 10/2006 | Amarendran et al. |
| 2009/0319534 A1 | 12/2009 | Gokhale |
| 2012/0150818 A1 | 6/2012 | Vijayan Retnamma et al. |
| 2012/0150826 A1 | 6/2012 | Vijayan Retnamma et al. |
| 2012/0173486 A1 | 7/2012 | Park et al. |
| 2014/0201170 A1 | 7/2014 | Vijayan et al. |
| 2016/0034357 A1* | 2/2016 | Anglin ............... G06F 11/2028 714/4.11 |
| 2016/0147610 A1 | 5/2016 | Anglin et al. |
| 2016/0350391 A1 | 12/2016 | Vijayan et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2019/0250839 A1* | 8/2019 | Bedadala ............. G06F 3/0605 |
| 2020/0192589 A1 | 6/2020 | Mehta et al. |
| 2020/0195719 A1 | 6/2020 | Mehta et al. |
| 2021/0042199 A1* | 2/2021 | Migga-Vierke ..... H04L 63/0272 |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: a Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, Kl, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

* cited by examiner

GEO-LOCATION-BASED DATA REPLICATION

INCORPORATION BY REFERENCE TO ANY PRIORITY APPLICATIONS

This application is continuation application to U.S. patent application Ser. No. 17/196,847, titled "GEO-LOCATION-BASED DATA REPLICATION" and filed Mar. 9, 2021, which claims the benefit of priority to U.S. Pat. App. No. 63/140,648, titled "GEO-LOCATION-BASED DATA REPLICATION" and filed Jan. 22, 2021, the disclosure of which is hereby incorporated by reference in its entirety.

Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that leverage their data. For instance, data analysis capabilities, information management, improved data presentation and access features, and the like, are in increasing demand.

The company may issue one or more client computing devices, such as laptops, desktop computers, and so forth, to the company's employees. The employee may work in a primary location, where the primary data on the client computing device is backed up to one or more secondary storage devices that are local to the primary location. For example, the employee may work in Newark, N.J., and the one or more secondary storage devices may be on the premises (e.g., "on-premise") of the employee's workplace or the one or more secondary storage devices may be located in a town or city relatively close to the employee's workplace, such as New York City, N.Y. or Tinton Falls, N.J. With the one or more secondary storage devices in relative proximity to the employee, a restoration of one or more files from the one or more secondary storage devices may be performed relatively quickly. The restoration is performed relatively quickly because there is a low latency in network communication traffic between the one or more secondary storage devices and the employee's client computing device.

However, the employee may travel or move from the primary location to a secondary location, where the secondary location is significantly farther from the primary location. For example, the employee may be required to travel from Newark, N.J. to San Francisco, Calif. to service a client of the company. In this case, restoring from the one or more secondary storage devices that are proximate to primary location will require significantly more time to perform as there is an increased latency cost in the network traffic between the client computing device and the one or more secondary devices. This increase in time can lead to increased downtime in the client computing device and may adversely affect the employee's ability to perform his or her duties in a timely manner.

SUMMARY

To address these and other deficiencies, this disclosure describes an information management system that implements geo-location-based data replication for one or more client computing devices. In the disclosed information management system, a storage manager may be responsible for managing the backup and/or restoration for one or more client computing devices. A client computing device may be located at a primary location, and may backup its primary data to one or more secondary storage devices, where the secondary storage devices may be located at a secondary storage location. In addition, a storage manager may replicate or otherwise copy the secondary copies from the one or more secondary storage devices to one or more auxiliary storage devices, where the one or more auxiliary storage devices are located at an auxiliary storage location. An auxiliary storage location may be located significantly further from the primary location than the secondary storage location. For example, the auxiliary storage location may be in a different state than the secondary storage location. The auxiliary storage location may also be a location where the user of the client computing often travels. For example, the user of the client computing device may work or operate from the primary location, and then travel to a location near or proximate to the auxiliary storage location. Having one or more auxiliary storage devices ensures that there are redundant copies of the secondary copy data stored in the one or more secondary storage devices.

One of the challenges that may arise is that the client computing device may move, or be moved, from the primary location to another location proximate to the one or more auxiliary storage devices and further away from the one or more secondary storage devices. Where the client computing device is closer to the one or more auxiliary storage devices, and further away from one or more of the secondary storage devices, the time to backup primary data from the client computing device to the one or more auxiliary storage devices may be less than the time required to backup primary data to one or more of the secondary storage devices. This is because there may be a lower latency between the one or more auxiliary storage devices and the client computing device than the latency between the one or more secondary storage devices and the client computing device. In this situation, it may be beneficial to designate the one or more auxiliary storage devices as the secondary storage devices, and the secondary storage devices as the auxiliary storage devices (e.g., swap the roles of the auxiliary storage devices and the secondary storage devices).

To facilitate whether the client computing device backs up a secondary copy of its primary data at the secondary storage devices or the auxiliary storage devices, the client computing device may be monitored or tracked to determine when the client computing device is geographically closer to the one or more auxiliary storage devices and to determine when the client computing device is geographically closer to the one or more secondary storage devices. Where the client computing device is geographically closer to the one or more secondary storage devices, a data agent residing on the client computing device is configured to backup primary data to the one or more secondary storage devices (e.g., create a secondary copy of the primary data at the one or more secondary storage devices). In this scenario, a secondary storage computing device that manages the one or more secondary storage devices may create an auxiliary copy of the secondary copy at the one or more auxiliary storage devices. Conversely, where the client computing device is geographically closer to the one or more auxiliary storage devices, the data agent of the client computing device may be configured to backup primary data to the one or more auxiliary storage devices rather than the one or more secondary storage devices. The one or more secondary storage devices are then assigned the role of the one of the auxiliary storage devices and the one or more auxiliary storage devices are then assigned the role of the one or more secondary storage devices.

As the client computing device may move between the primary location and the other location, the client computing device may create secondary copies at the one or more secondary storage devices and secondary copies at the one or more auxiliary storage devices. As the one or more secondary storage devices are primarily tasked with storing secondary copies of the primary data of the client computing device, it may be preferable that the one or more secondary storage devices maintain all instances, or any copies of, secondary copies of the primary data of the client computing device. However, as the data agent may cause secondary copies to be created at the one or more auxiliary storage devices, there may be instances where the one or more auxiliary storage devices have a more up-to-date secondary copy of the primary data of the client computing device rather than the secondary storage device. Accordingly, this disclosure provides for synchronizing the secondary copies of the primary data between the one or more secondary storage devices and the one or more auxiliary storage devices.

Furthermore, there may be instances where the client computing device is at the other location for a short duration of time (e.g. 1 day, 3 days, etc.). As the client computing device may be at the other location for this short duration of time, it may be preferable that the data agent of the client computing device continue using the one or more secondary storage devices for the secondary copies rather than directing the creation of the secondary copies to the one or more auxiliary storage devices. For example, the client computing device may be on a backup schedule where the backup occurs after the client computing device leaves the other location. Alternatively, the client computing device may be on a daily backup schedule, but the duration of time in which the client computing device is at the other location is a short duration of time (e.g., 2-3 days). In these cases, it may be preferable for the client computing device to continue using the one or more secondary storage devices for storing the secondary copies rather than designating the one or more auxiliary storage devices for storing the secondary copies.

Accordingly, this disclosure also provides for a machine-learning algorithm that uses one or more signals to determine the client computing device, after having moved from the primary location to the other location, is likely to remain at the other location for an extended period of time. The machine-learning algorithm may be initially trained with one or more training data sets, where the training data sets include signals that indicate whether a client computing device is likely to remain at a particular location and, if so, the amount of time that the client computing device may spend at the particular location. The machine-learning algorithm may output one or more confidence values, where one of the confidence values indicate the likelihood that the client computing device will remain at a particular geographic location. The signals input to the machine-learning algorithm may include Global Positioning Satellite (GPS) information, calendaring information, wireless network information, Internet Protocol (IP) address information, network topography information, and other such information or combinations thereof. The data agent uses the confidence values output from the machine-learning algorithm to determine whether to send backups of primary data.

The technological benefit of the disclosed implementations is that the time to backup a client computing device is significantly reduced where there are multiple locations available to the client computing device for performing the backup. Under a conventional approach, the client computing device may continuing backing up to a secondary storage device after the client computing device has moved a distance away from the secondary storage device. However, in the systems and methods disclosed herein, a client computing device is automatically configured to backup its primary data to a geographically closer storage device (e.g., the auxiliary storage device), which results in lower latency in backing up the primary data. Furthermore, because the disclosed systems and methods employ a machine-learning algorithm, the machine-learning algorithm can be used to predict whether a move of the client computing device from one geographic location to another geographic location is permanent or temporary.

DETAILED DESCRIPTION

Detailed descriptions and examples of systems and methods according to one or more illustrative embodiments may be found in the section titled "Geo-location-based Data Replication," as well as in the section titled Example Embodiments, and also in FIGS. 3-8 herein. Furthermore, components and functionality for the disclosed recovery manager may be configured and/or incorporated into information management systems such as those described herein in FIGS. 1A-1H and 2A-2C.

Various embodiments described herein are intimately tied to, enabled by, and would not exist except for, computer technology. For example, the transference of backup jobs from the storage manager to the recovery manager described herein, in reference to various embodiments, cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
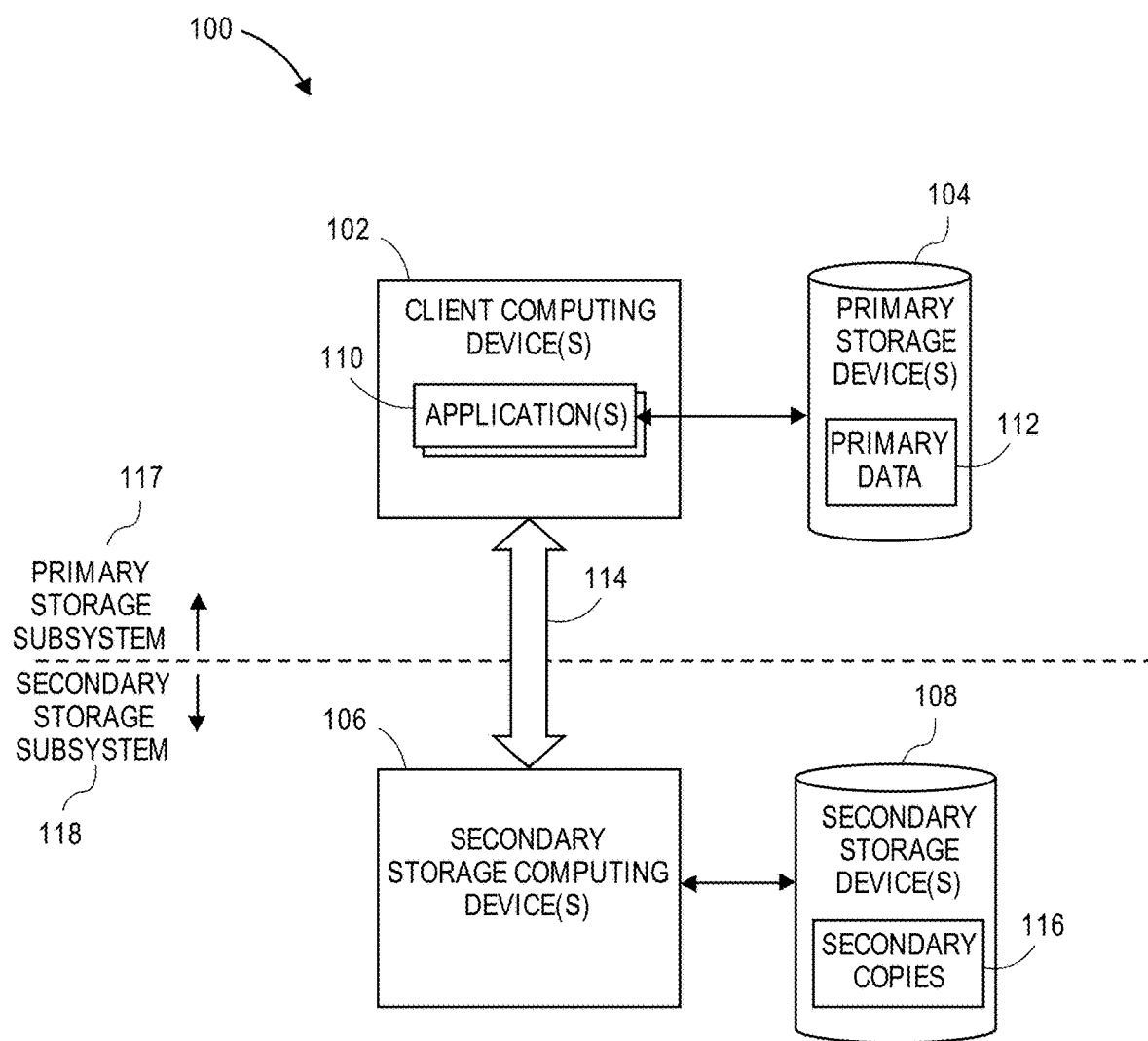
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,734,669, entitled "Managing Copies Of Data";
- U.S. Pat. No. 7,747,579, entitled "Metabase for Facilitating Data Classification";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 8,364,652, entitled "Content-Aligned, Block-Based Deduplication";
- U.S. Pat. No. 8,578,120, entitled "Block-Level Single Instancing";
- U.S. Pat. No. 8,954,446, entitled "Client-Side Repository in a Networked Deduplicated Storage System";
- U.S. Pat. No. 9,020,900, entitled "Distributed Deduplicated Storage System";
- U.S. Pat. No. 9,098,495, entitled "Application-Aware and Remote Single Instance Data Management";
- U.S. Pat. No. 9,239,687, entitled "Systems and Methods for Retaining and Using Data Block Signatures in Data Protection Operations";

U.S. Pat. Pub. No. 2006/0224846, entitled "System and Method to Support Single Instance Storage Operations" (now abandoned);

U.S. Pat. Pub. No. 2014/0201170, entitled "High Availability Distributed Deduplicated Storage System", now U.S. Pat. No. 9,633,033;

U.S. Pat. Pub. No. 2016/0041880 A1, entitled "Efficient Application Recovery in an Information Management System Based on a Pseudo-Storage-Device Driver", now U.S. Pat. No. 9,852,026;

U.S. patent application Ser. No. 14/721,971, entitled "Replication Using Deduplicated Secondary Copy Data", published as U.S. Pat. Pub. No. 2016/0350391;

U.S. patent application Ser. No. 14/805,615, entitled "Browse and Restore for Block-Level Backups", now U.S. Pat. No. 9,766,825.

U.S. Provisional Patent Application No. 62/265,339 entitled "Live Synchronization and Management of Virtual Machines across Computing and Virtualization Platforms and Using Live Synchronization to Support Disaster Recovery", to which U.S. patent application Ser. No. 15/365,756 claims priority (now U.S. Pat. No. 10,228,962);

U.S. Provisional Patent Application No. 62/273,286 entitled "Redundant and Robust Distributed Deduplication Data Storage System", to which U.S. patent application Ser. No. 15/299,254 (now U.S. Pat. No. 10,310,953), Ser. No. 15/299,281 (published as U.S. Pat Pub. 2017-0192868), Ser. No. 15/299,291 (now U.S. Pat. No. 10,138,729), Ser. No. 15/299,298 (now U.S. Pat. No. 10,592,357), Ser. No. 15/299,299 (published as U.S. Pat. Pub. US 2017-0193003), and Ser. No. 15/299,280 (now U.S. Pat. No. 10,061,663) all claim priority;

U.S. Provisional Patent Application No. 62/294,920, entitled "Data Protection Operations Based on Network Path Information", to which U.S. patent application Ser. No. 15/283,033 claims priority (published as U.S. Pat. Pub. No. 2017/0235647 (now abandoned));

U.S. Provisional Patent Application No. 62/297,057, entitled "Data Restoration Operations Based on Network Path Information", to which U.S. patent application Ser. No. 15/286,403 claims priority (published as U.S. Pat. Pub. No. 2017/0242871); and U.S. Provisional Patent Application No. 62/387,384, entitled "Application-Level Live Synchronization Across Computing Platforms Including Synchronizing Co-Resident Applications To Disparate Standby Destinations And Selectively Synchronizing Some Applications And Not Others", to which U.S. patent application Ser. No. 15/369,676 claims priority (now U.S. Pat. No. 10,387,266).

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1B:
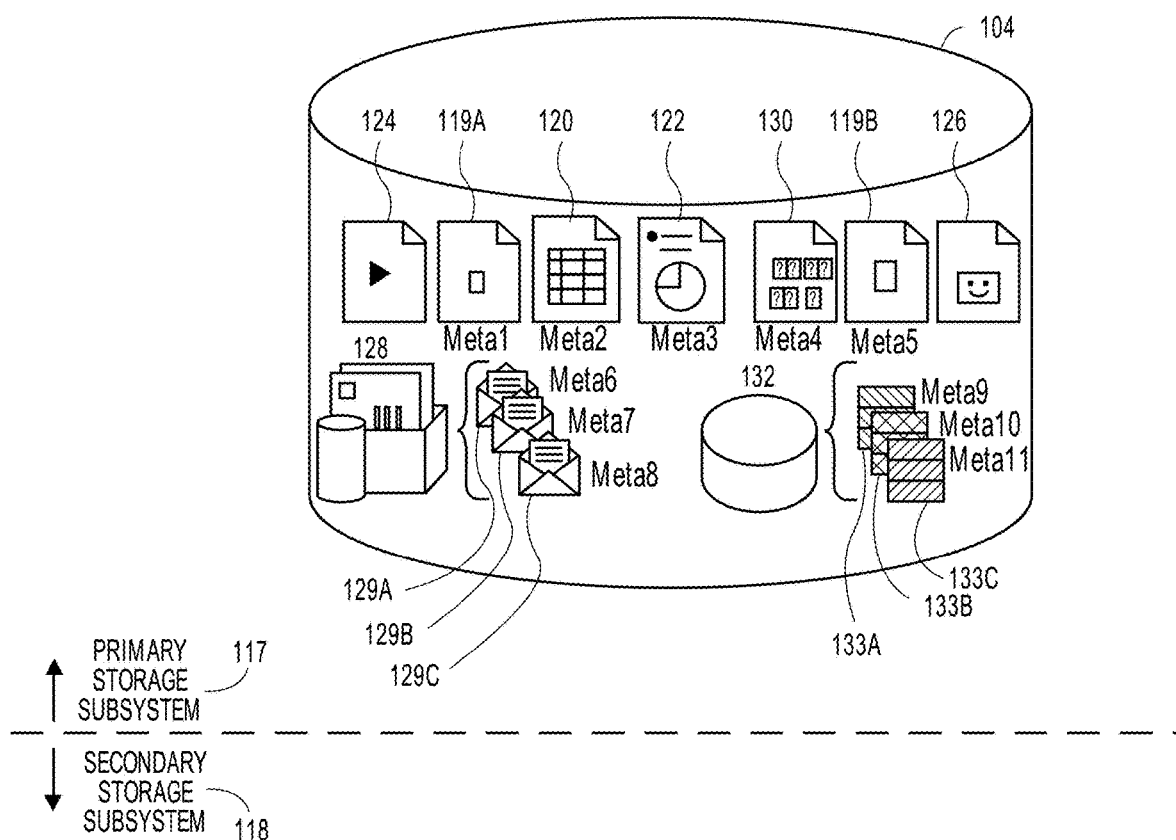
FIG. 1B is a detailed view of a primary storage device, a secondary storage device, and some examples of primary data and secondary copy data.
Figure 1B:
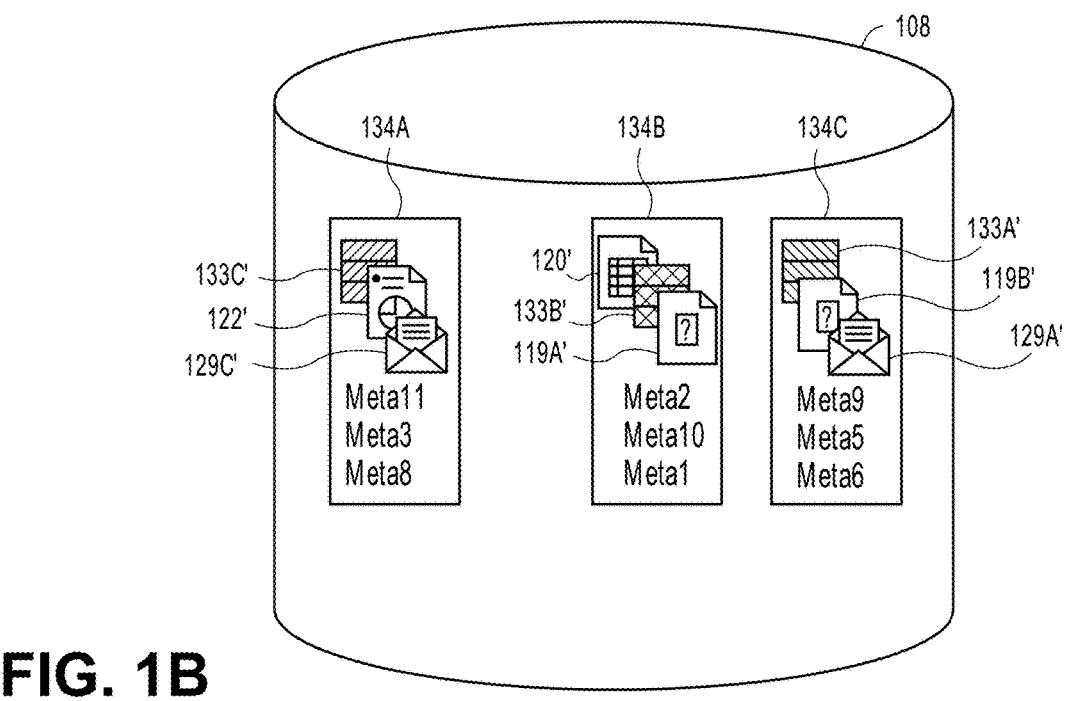
Figure 1C:
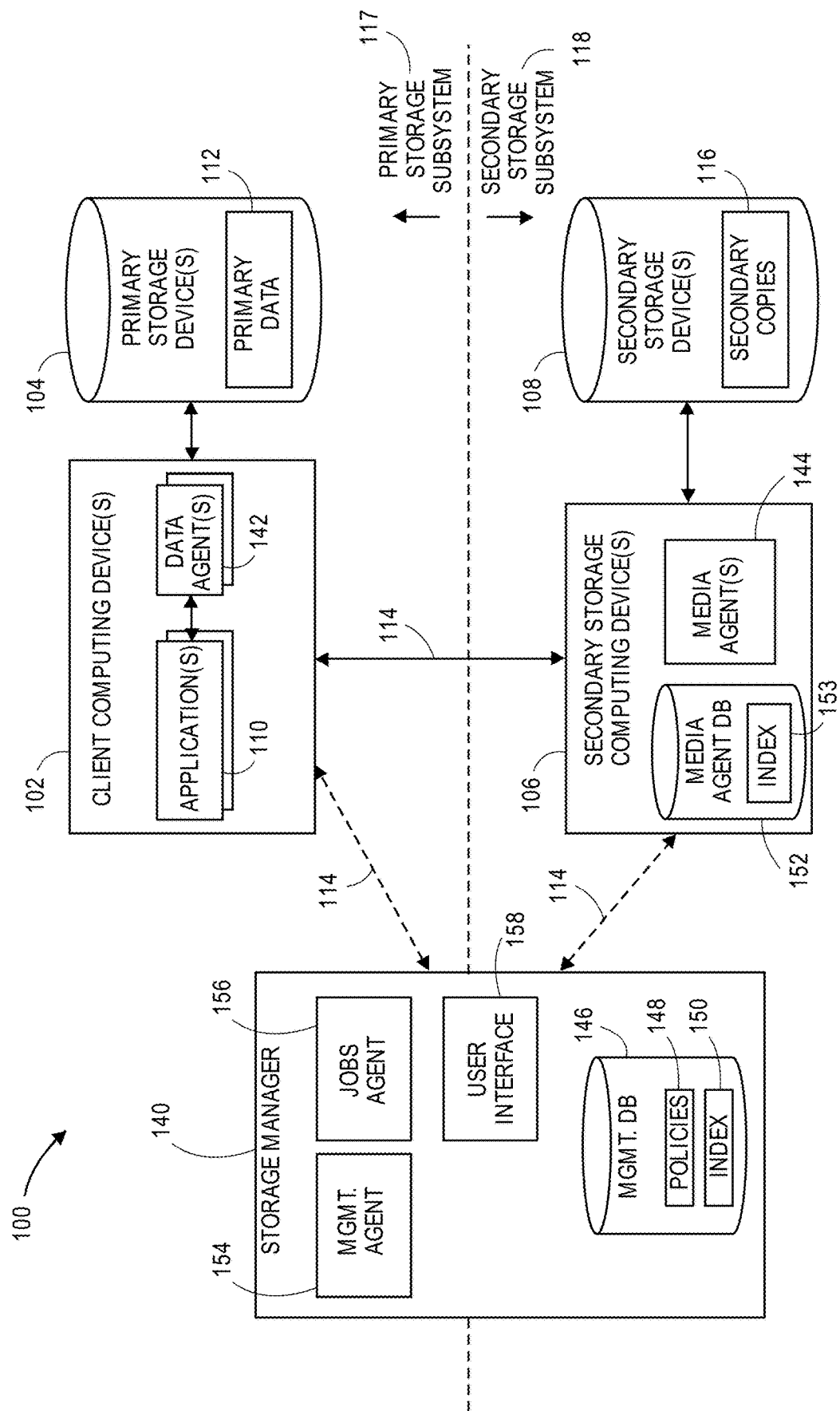
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG.

1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:
communicating with data agents 142 and media agents 144, including transmitting instructions, messages, and/or queries, as well as receiving status reports, index information, messages, and/or queries, and responding to same;
initiating execution of information management operations;
initiating restore and recovery operations;
managing secondary storage devices 108 and inventory/capacity of the same;
allocating secondary storage devices 108 for secondary copy operations;
reporting, searching, and/or classification of data in system 100;
monitoring completion of and status reporting related to information management operations and jobs;
tracking movement of data within system 100;
tracking age information relating to secondary copies 116, secondary storage devices 108, comparing the age information against retention guidelines, and initiating data pruning when appropriate;
tracking logical associations between components in system 100;
protecting metadata associated with system 100, e.g., in management database 146;
implementing job management, schedule management, event management, alert management, reporting, job history maintenance, user security management, disaster recovery management, and/or user interfacing for system administrators and/or end users of system 100;
sending, searching, and/or viewing of log files; and
implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, Share Point data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
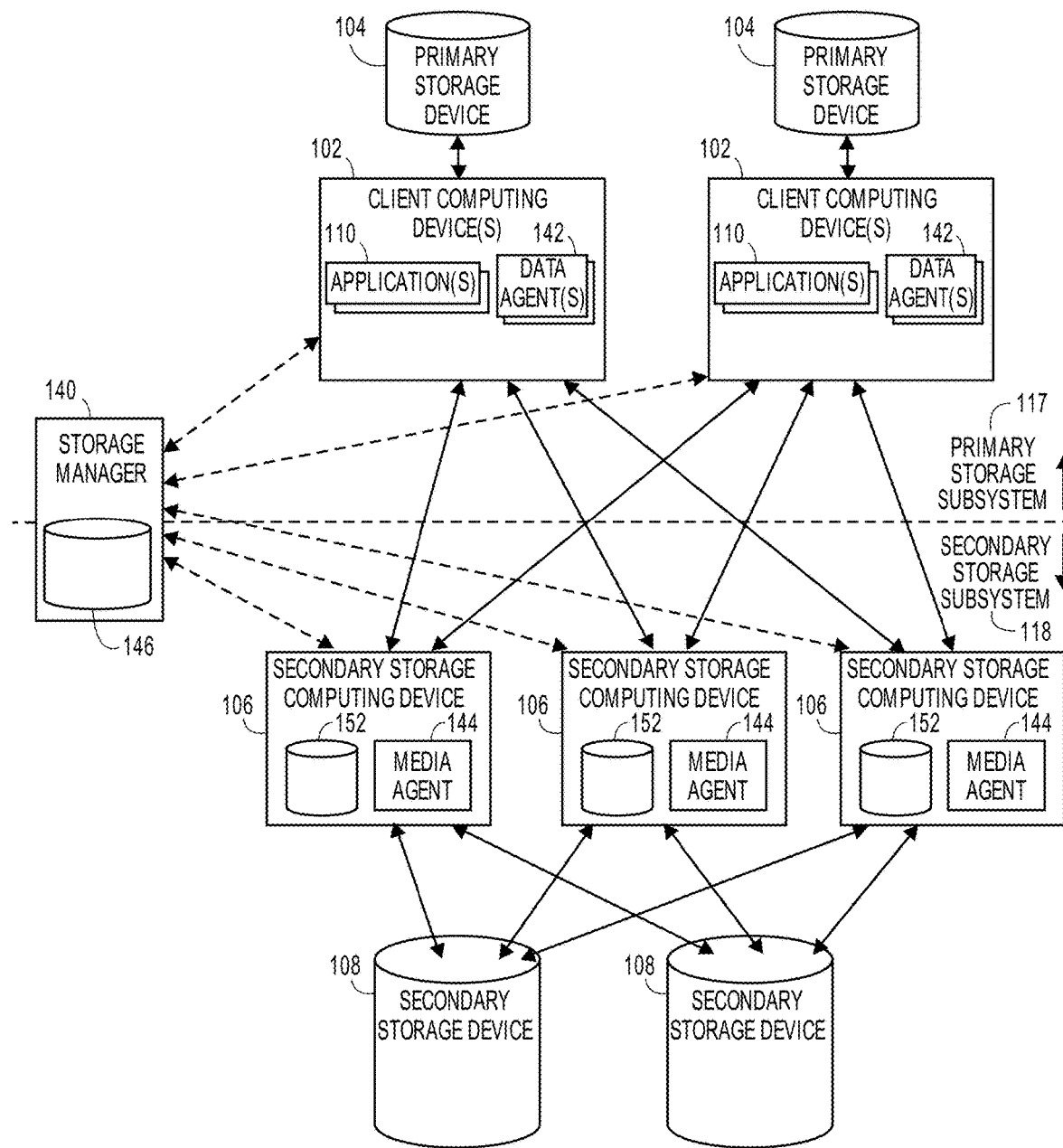
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and can make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "online archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Copy Operations

Figure 1E:
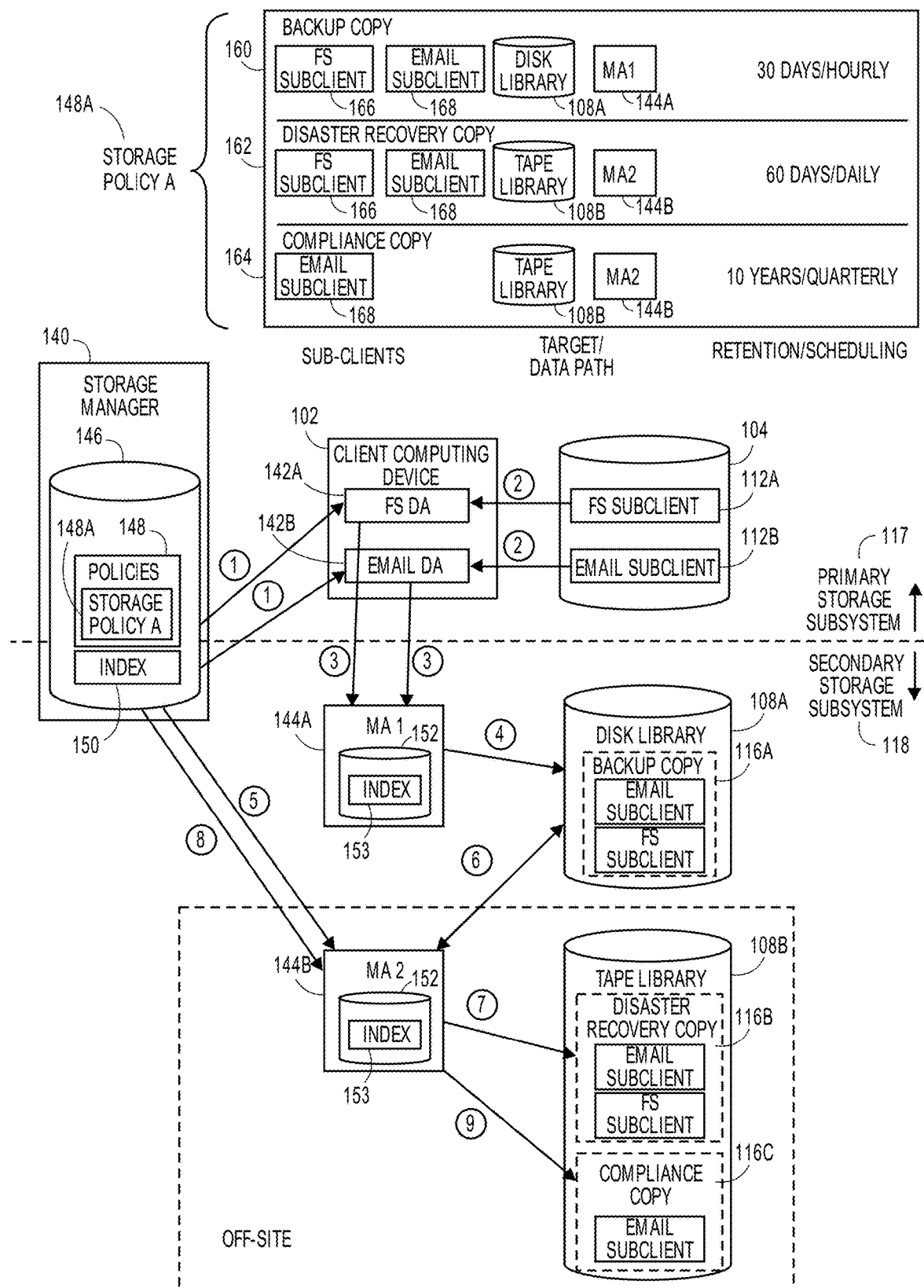
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
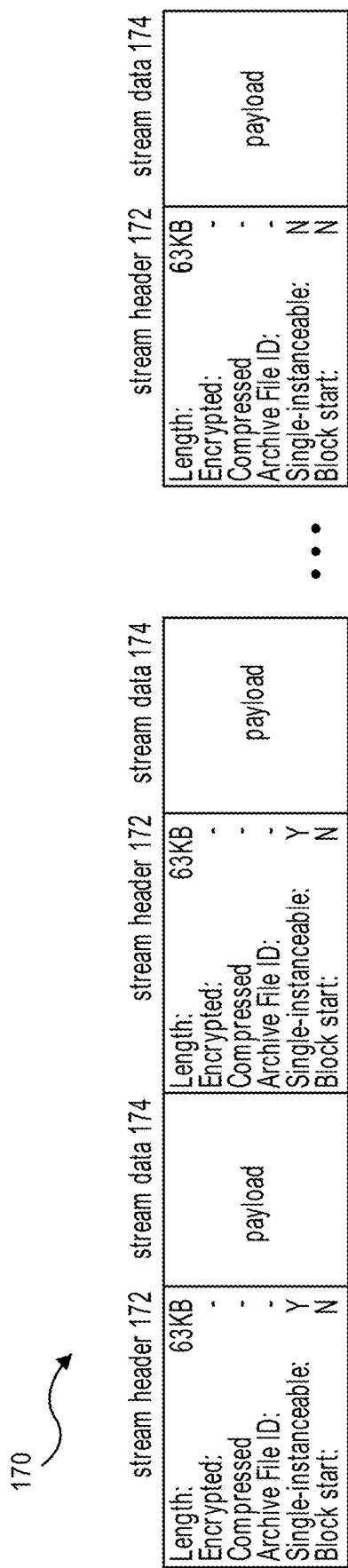
FIGS. 1F-1H are block diagrams illustrating suitable data structures that may be employed by the information management system.
Figure 1G:
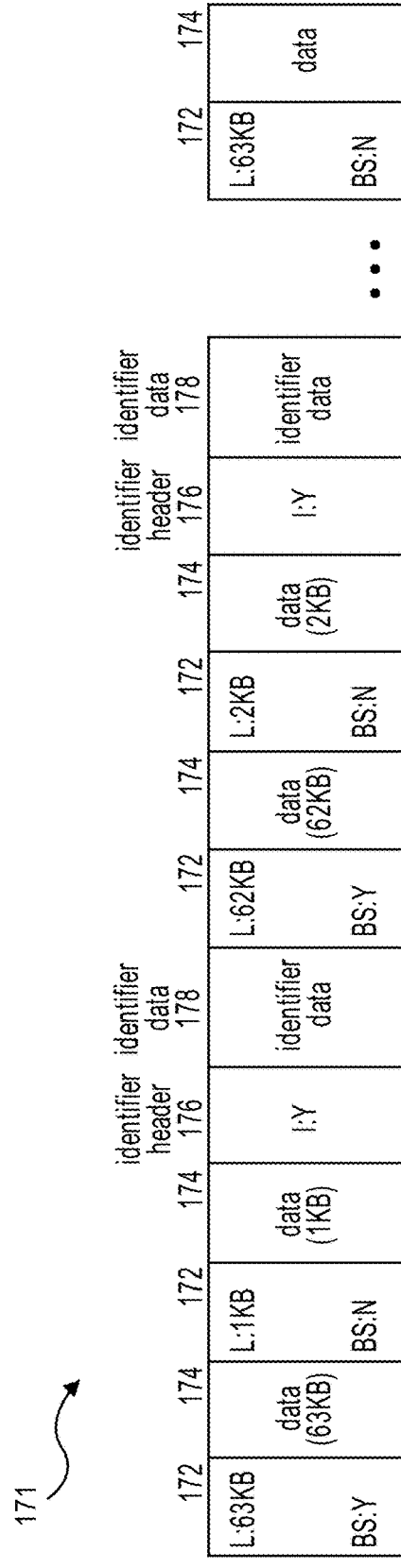

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
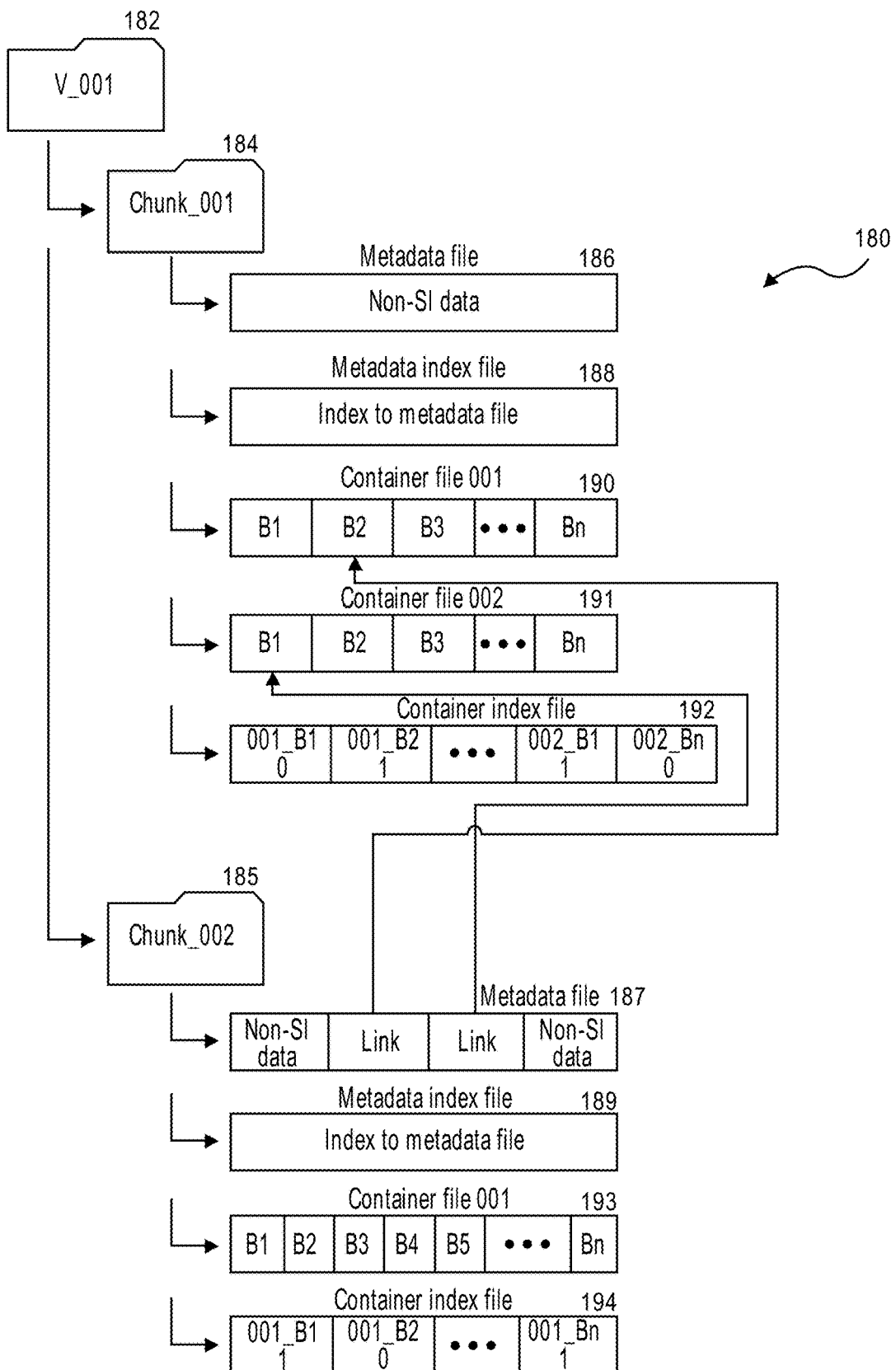

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
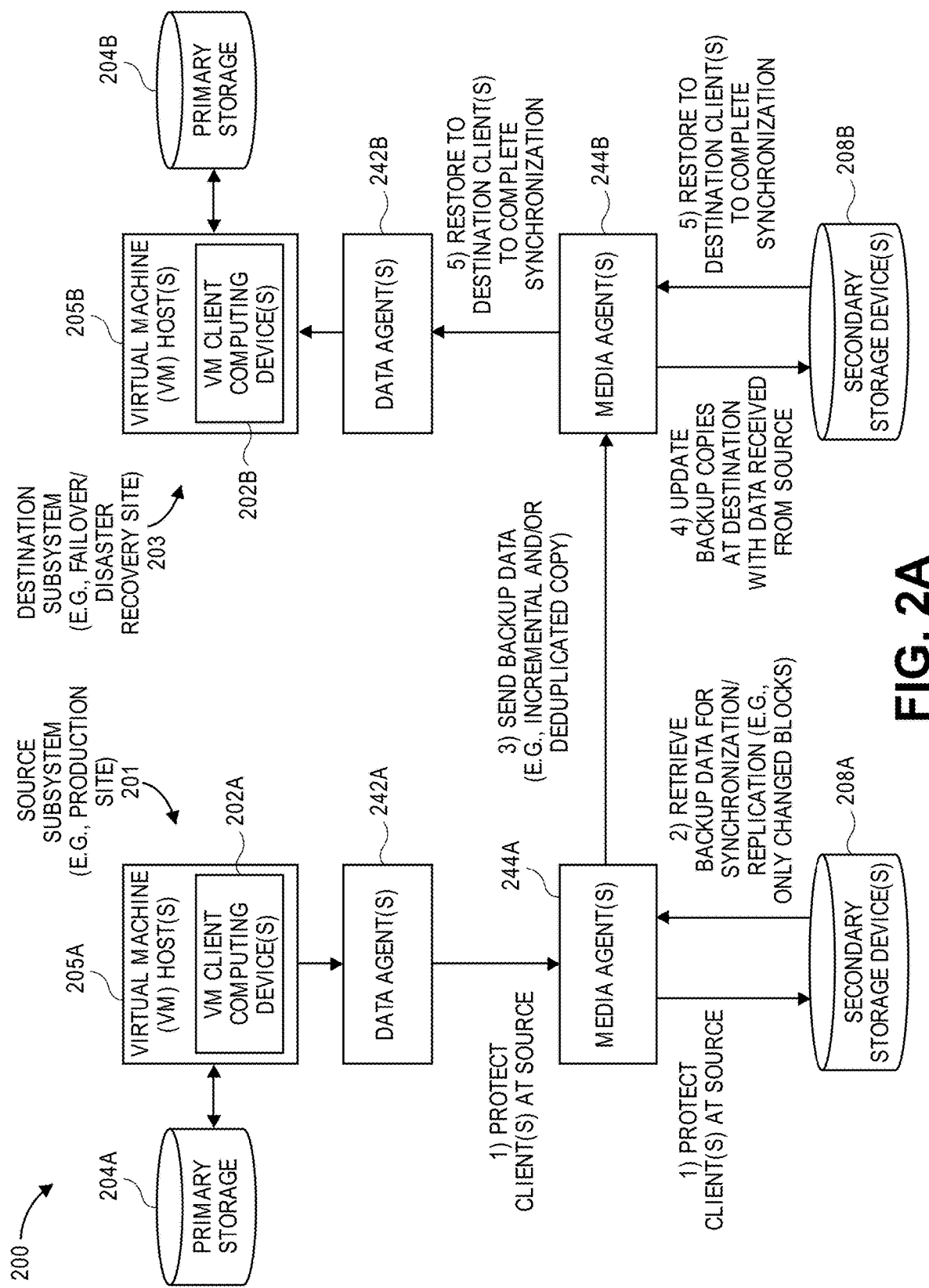
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
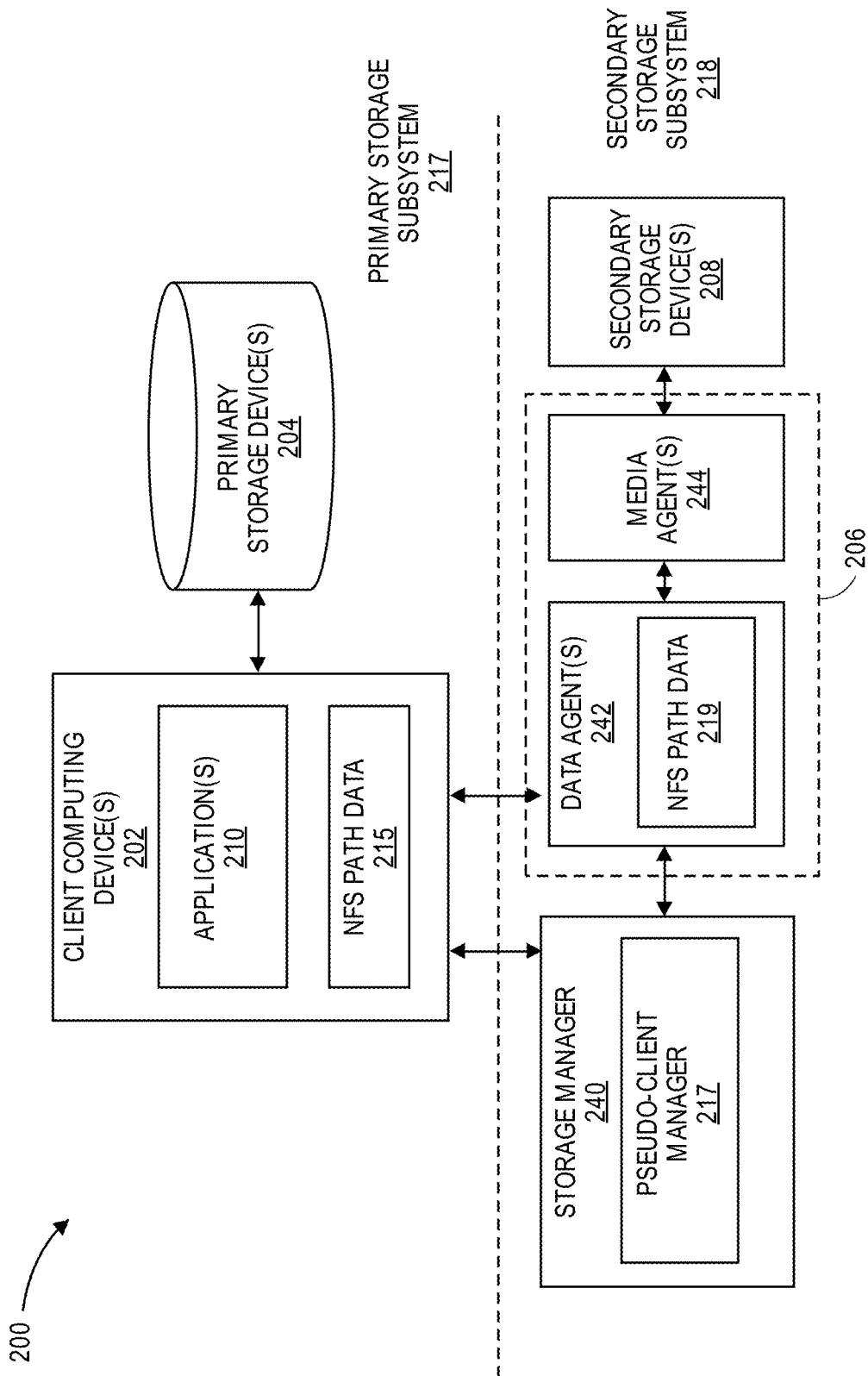
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
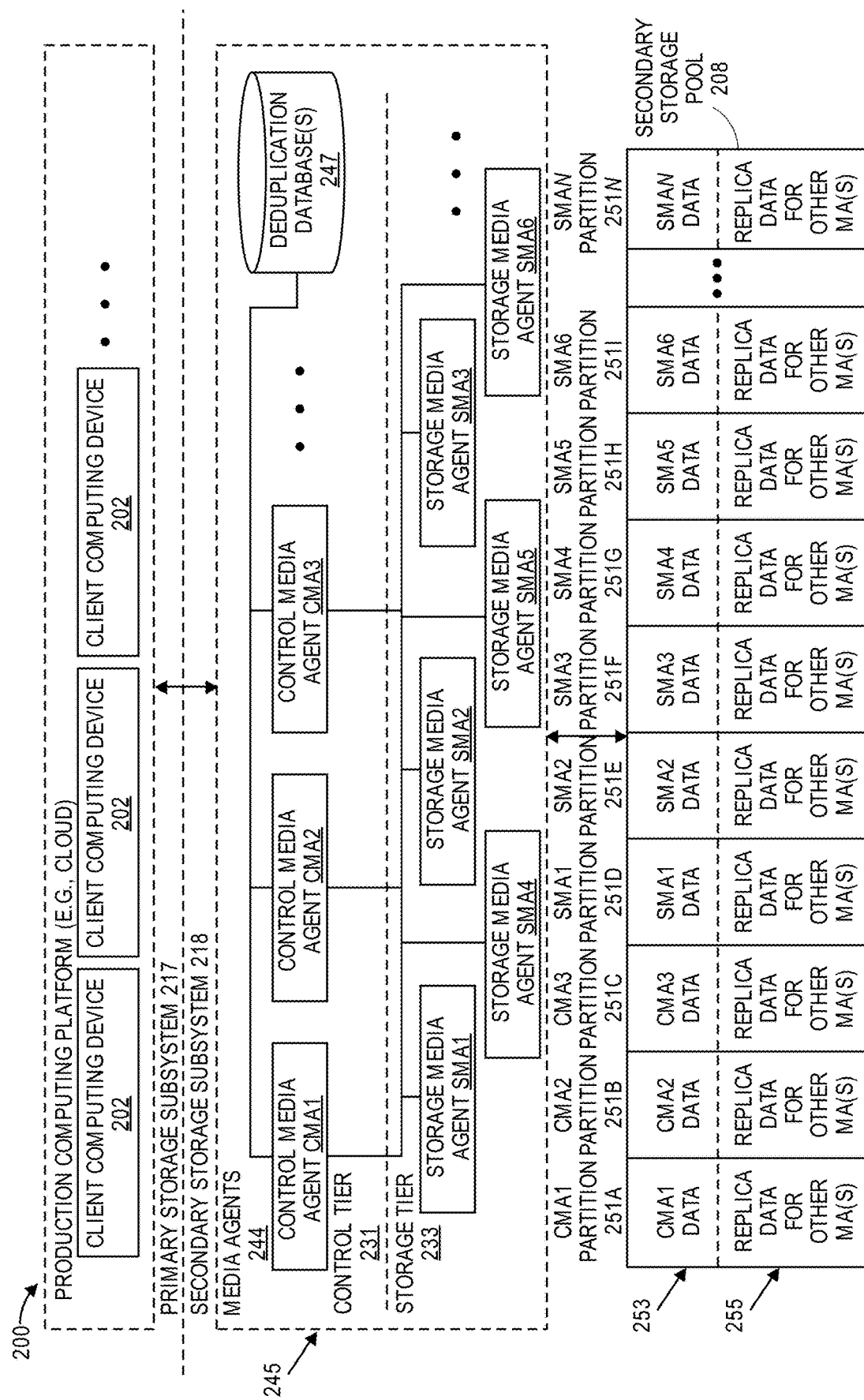
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Geo-Location-Based Data Replication

A client computing device, such as client computing device 102, may move or be moved between various geographic locations, where one geographic location is considered a primary geographic location and the other geographic locations are considered secondary, tertiary, quaternary, etc., geographic locations. At the primary geographic location, the client computing device may backup primary data to one or more secondary storage devices (e.g., one or more of the secondary storage devices 108), and the secondary copies stored in the one or more secondary storage devices 108 may be replicated to one or more auxiliary storage devices. The one or more auxiliary storage devices may be located in a different geographic location or region than the one or more secondary storage devices. The one or more auxiliary storage devices may be located in a different geographic location or a different geographic region to ensure redundancy and continuation of operations in the event that the geographic location where the one or more secondary storage devices are located becomes compromised. The client computing device may be initially configured to back up primary data to the one or more secondary storage devices, and the one or more secondary storage devices may be configured to create auxiliary copies at the one or more auxiliary storage devices.

Figure 3:
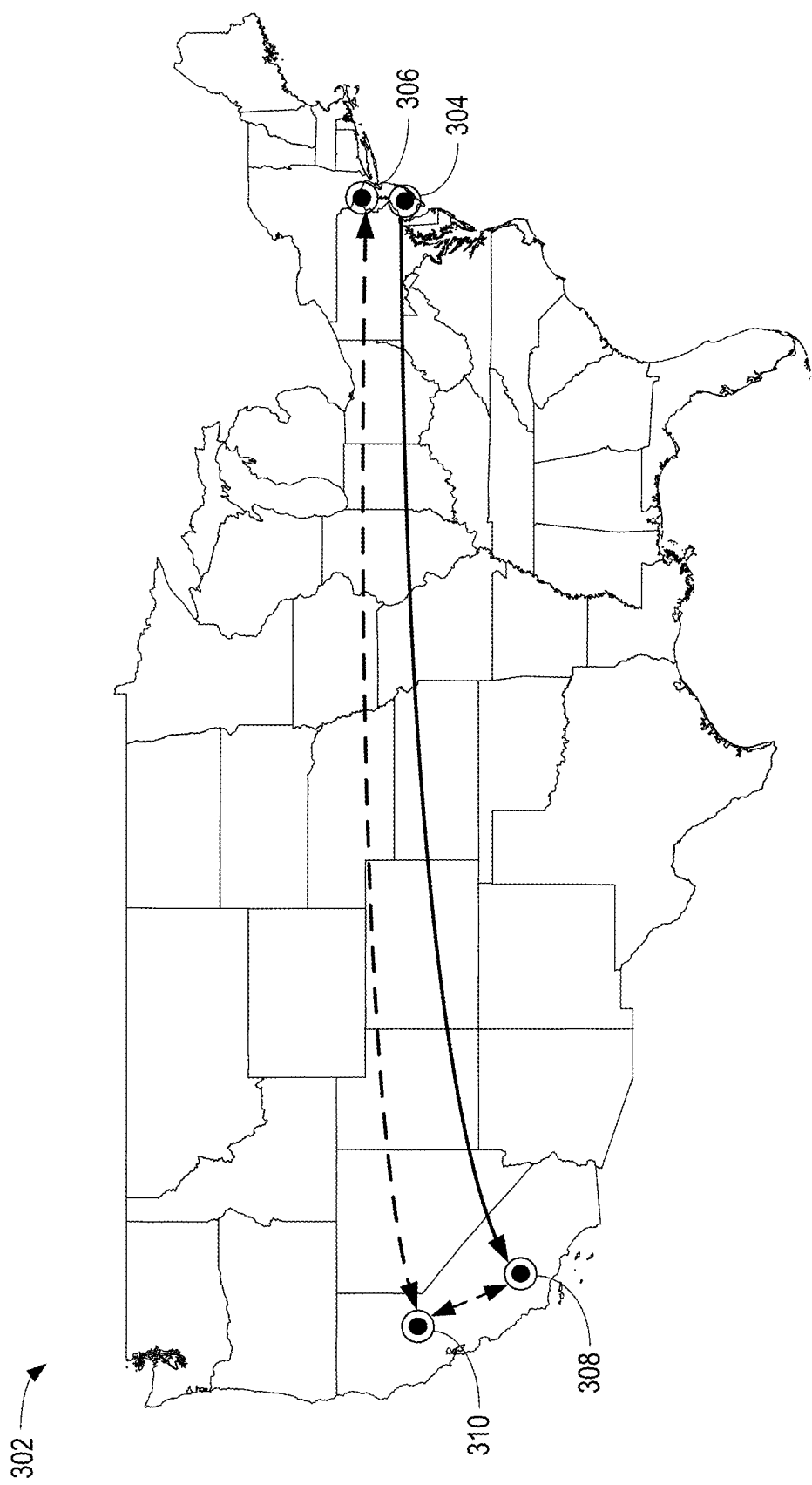
FIG. 3 illustrates a map, according to an example embodiment, depicting the communication pathways for the client computing device depending on where the client computing device is located.

FIG. 3 illustrates a map 302, according to an example embodiment, depicting the communication pathways for the client computing device depending on where the client computing device is located. In one embodiment, the client computing device may be initially located at a first geographic location 304, where one or more secondary storage devices are located a second geographic location 306 (e.g., a secondary data location). In the embodiment depicted in FIG. 3, the first geographic location 304 may be a primary geographic location for the client computing device, and the second geographic location 306 may be a geographic location and/or a secondary data location where one or more of the secondary storage devices are located. A bidirectional arrow between the first geographic location 304 and the second geographic location 306 indicates that data flows between the first geographic location 304 and the second geographic location 306, such as backup copies to the one or more secondary storage devices and restorations of files to the client computing device.

The map 302 also illustrates a third geographic location 308 and a fourth geographic location 310. The third geographic location 308 may be a location where an employee works and carries the client computing device with him or her. The fourth geographic location 310 may be a location where there are one or more auxiliary storage devices. The fourth geographic location 310 may be considered an auxiliary data location since the one or more auxiliary storage devices may be located there. The one or more secondary storage devices located at the second geographic location 306 may create one or more auxiliary copies of copies at the one or more auxiliary storage devices located at the fourth geographic location 310. Because of the distance between the second geographic location 306 and the fourth geographic location 310, the amount of time required to create an auxiliary copy in the one or more auxiliary storage devices from the secondary copy in the one or more secondary storage devices is greater than the time required to back up the primary data of the client computing device when the client computing device is located at the first geographic location 304. In other words, the distances between the various geographic locations affect the time required to create secondary copies or auxiliary copies.

Furthermore, when the client computing device is located at the third geographic location 308, the latency in backing up primary data of the client computing device to the one or more secondary storage devices located at the second geographic location 306 is greater than if the client computing device was located at the first geographic location. Accordingly, it would be preferable if the client computing device was able to back up its primary data to the one or more auxiliary storage devices located at the fourth geographic location 310, and then synchronize the one or more auxiliary storage devices with the one or more secondary storage devices. In addition, to continue the goals of redundancy and operations continuation, the one or more secondary storage devices may be designated as auxiliary storage devices for the client computing device, and the one or more auxiliary storage devices located at the fourth geographic location 310 may create one or more auxiliary copies at the one or more secondary storage devices located at the second geographic location 306. In this manner, when the client computing device is located at the third geographic location 308, the roles of the one or more secondary storage devices and the one or more auxiliary storage devices are swapped relative to the client computing device. The swapping of roles is relative to the client computing device located at the third geographic location 308 because there may be other client computing devices located at the first geographic location 304 where it is preferable that the other client computing devices continuing using the one or more secondary storage devices located at the second geographic location 306 for storing secondary copies.

When the client computing device moves from the first geographic location 304 to the third geographic location 308, the move may be temporary or permanent. In this case, the concepts of temporary or permanent may be definable based on a predetermined time period. For example, the predetermined time period may be defined as seven days, where staying at one location for less than seven days is considered "temporary," and staying at the one location for seven or more days is considered "permanent." The predetermined time period may be measured in other amounts of time, such as minutes, hours, months, and so forth. Furthermore, other examples of the predetermined time period include but are, not limited to, three days, five days, 30 days, and so forth.

Alternatively, and/or additionally, to using a predetermined time period to determine whether the move of the client computing device is temporary or permanent, the client computing device may be programmed or configured with a machine-learning algorithm that accepts various input signals to output a confidence or probability value that the move is temporary or permanent. The machine-learning algorithm may be trained using one or more input signals to output the confidence or probability values and may include, but not limited to, calendaring information, wireless Service Set Identifiers (SSIDs), Global Positioning Satellite (GPS) information, Internet Protocol (IP) address information, network topography information, and other such information or combinations thereof. The training data may include various combinations of the input signals, where each combination is associated with a corresponding probability or confidence value that the combination of signals indicates a temporary move or a permanent move. Additional details regarding the machine-learning algorithm are discussed with reference to FIG. 5.

Figure 4:
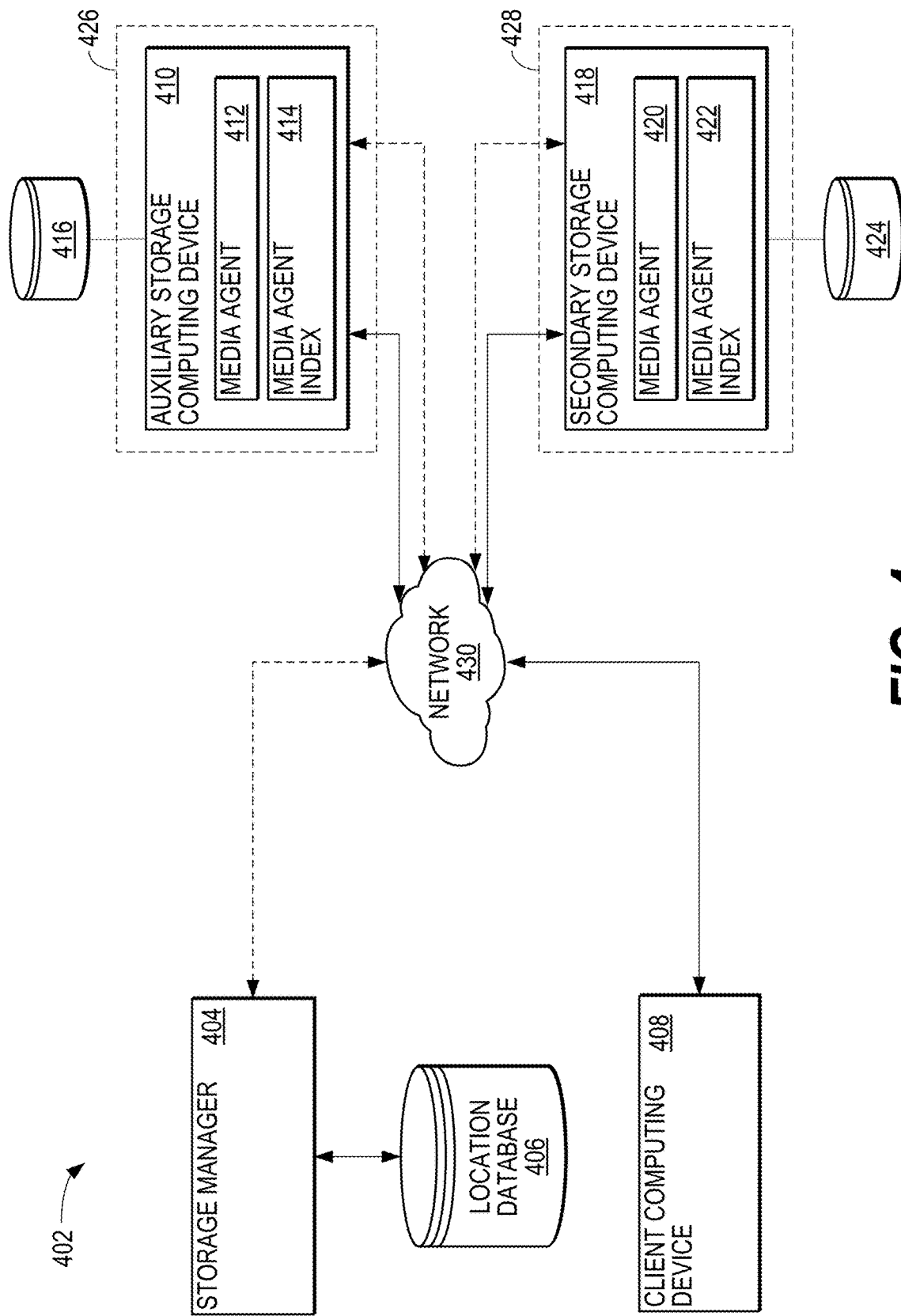
FIG. 4 illustrates another information management configured to perform geo-based location data replication, in accordance with an example embodiment.

FIG. 4 illustrates another information management system 402 configured to perform geo-based location data replication, in accordance with an example embodiment. In one embodiment, the information management system 402 includes a storage manager 404 in communication with a client computing device 408, a secondary storage computing device 418, and an auxiliary storage computing device 410. The storage manager 404, the client computing device 408, the auxiliary storage computing device 410, and the secondary storage computing device 418 may each communicate with each other via a network 430, where the network 430 may include multiple networks.

The storage manager 404 may be implemented similarly to the storage manager 140 discussed with reference to FIG. 1C. In addition, the storage manager 404 may include, or be in communication with, a location database 406. The location database 406 may be implemented as one or more databases and may include one or more different types of databases such as a hierarchical database, a relational database, an object-oriented database, a flat file, or any other type of database or combinations thereof.

The location database 406 may include one or more entries, where each entry associates a client computing device (e.g., client computing device 408) with a geographic location (e.g., a particular postal address, a ZIP code, a city, etc.). The entries of the location database 406 may also associate one or more secondary storage computing devices (e.g., secondary storage computing device 418) with their respective geographic location (e.g., geographic location 428), and one or more auxiliary storage computing devices (e.g., auxiliary storage computing device 410) with their respective geographic locations (e.g., geographic location 426). With regard to the geographic locations of the secondary storage computing devices and the auxiliary storage computing devices, these locations may be added to the location database 406 via an operator or administrator of the storage manager 404 and/or an operator or administrator of the information management system 402.

The secondary storage computing device 418 may be implemented similarly to the secondary storage computing device 106 illustrated in FIG. 1C. The secondary storage computing device 418 may include a media agent 420 and a media agent index 422, and may be in communication with a secondary storage device 424. The media agent 420 may be implemented similarly to the media agent 144 illustrated in FIG. 1C, and the media agent index may be implemented similarly to the media agent index 153.

The secondary storage computing device 418 may be located at a geographic location 428, where the location database 406 includes an entry that associates the secondary storage computing device 418 with the geographic location 428. In this regard, the geographic location 428 may be considered a secondary storage location. With reference to FIG. 3, the geographic location 428 may be the second geographic location 306, where the client computing device 408 is located at the first geographic location 304.

The secondary storage computing device 418 may be managed by the storage manager 404 and may be configured to create secondary copies of the primary data stored on client computing device 408. However, the secondary storage computing device 418 is not limited to creating secondary copies of the primary data stored by the client computing device 408. In particular, and depending on the geographic location of the client computing device 408, the secondary storage computing device 418 may be configured by the storage manager 404 to create auxiliary copies of secondary copies managed by the auxiliary storage computing device 410. As discussed below, the storage manager 404 may determine that the client computing device 408 is geographically closer to the auxiliary storage computing device 410, in which case, the storage manager 404 may instruct the client computing device 408 to use the auxiliary storage computing device 410 for backup (e.g., to create secondary copies), and then may instruct the secondary storage computing device 418 to create auxiliary copies from the secondary copies managed by the auxiliary storage computing device 410.

The auxiliary storage computing device 410 may be implemented similarly to the secondary storage computing device 106 illustrated in FIG. 1C. The auxiliary storage computing device 410 may also include a media agent 412 and a media agent index 414, where the media agent 412 is implemented similarly to the media agent 144, and the media agent index 414 may be implemented similarly to the media agent index 153. The auxiliary storage computing device 410 may also be in communication with an auxiliary storage device 416 that stores auxiliary copies of secondary copies stored in the secondary storage device 424.

The auxiliary storage computing device 410 may be located at a geographic location 426, where the location database 406 includes an entry that associates the auxiliary storage computing device 410 with the geographic location 426. In this regard, the geographic location 426 may be considered an auxiliary storage location. With reference to FIG. 3, the geographic location 426 may be the fourth geographic location 310. Because the auxiliary storage computing device 410 manages auxiliary copies, it may be acceptable for the distance between the client computing device 408 and the auxiliary storage computing device 410 to be greater than the distance between the client computing device 408 and the secondary storage computing device 418.

As explained previously, as the distance between the client computing device 408 and the secondary storage computing device 418 increases, the time required to create a secondary copy in the secondary storage device 424 may also increase. Thus, when the client computing device 408 is geographically closer to the auxiliary storage computing device 410, it is preferable that the client computing device 408 create secondary copies in the auxiliary storage device 416, which may then be later synchronized by the storage manager 404 and/or the secondary storage computing device 418 to the secondary storage device 424. In this regard, synchronization may include determining whether there are differences in the secondary copies stored by the auxiliary storage device 416 and any auxiliary copies stored by secondary storage device 424, copying one or more secondary copies to the auxiliary storage device 416, and creating one or more auxiliary copies of the secondary copies in the secondary storage device 424. In some instances, a secondary copy may be deleted from the auxiliary storage device 416 and/or the secondary storage device 424 based on the age of the secondary copy.

In one embodiment, the synchronization may occur within a predetermined time period after the client computing device 408 creates a secondary copy in the auxiliary storage device 416 (e.g., 10 minutes, 3 hours, 24 hours, etc.). In another embodiment, the auxiliary storage computing device 410 synchronizes the secondary copies stored in the auxiliary storage device 416 with the secondary copies stored in the secondary storage device 424 when the client computing device 408 is closer in geographical proximity to the secondary storage computing device 418 and geographically farther from the auxiliary storage computing device 410. In yet a further embodiment, the storage manager 404 maintains an information management policy that determines when the auxiliary storage computing device 410 synchronizes with the secondary storage computing device 418. In this embodiment, the storage manager 404 may instruct the auxiliary storage computing device 410 to synchronize with the secondary storage computing device 418 according to the information management policy.

The storage manager 404 may be configured to instruct the client computing device 408 as to when it should use the secondary storage computing device 418 for creating secondary copies or when it should use the auxiliary storage computing device 410 for creating the secondary copies. In one embodiment, the storage manager 404 receives a message or communication from the client computing device 408 that indicates or identifies the geographic location of the client computing device 408 (e.g., location information), a flag or identifier that indicates whether the client computing device 408 has moved from its previous geographic location, and, if the client computing device 408 has moved from its previous geographic location, whether the move to the new geographic location is a temporary or permanent move. The foregoing flags, identifiers, and/or location information is one example of the types of information that may be included in messages or transmissions sent to the storage manager 404 from the client computing device 408. Alternative flags, identifiers, and/or location information, or various combinations of the foregoing are also possible.

Upon receipt of the message or communication from the client computing device 408 that is has moved to a new location, the storage manager 404 may reference one or more flags and/or identifiers in the message or communication to determine whether the client computing device 408 has geographically moved and, if so, whether the move is a temporary or permanent move. Whether the move is a temporary or permanent move signals to the storage manager 404 that the client computing device 408 will be remaining at its geographical location for a non-trivial amount of time and that, if the client computing device 408 is closer to an auxiliary storage computing device 410 than the secondary storage computing device 418, then the client computing device 408 should use the auxiliary storage computing device 410 for storing one or more secondary copies of its primary data. Where a flag or identifier indicates that the move by the client computing device 408 is a temporary move, the storage manager 404 may maintain the secondary storage computing device 418 as the storage computing device for the client computing device 408 to use in creating secondary copies.

Alternatively, where the flag or identifier indicates that the move by the client computing device 408 is a permanent move, the storage manager 404 may reference the location database 406 to determine whether the client computing device 408 should continue creating secondary copies at the secondary storage device 424 or whether the client computing device 408 should begin creating secondary copies at the auxiliary storage device 416. In one embodiment, the storage manager initially determines a first distance between the client computing device 408 and the storage device it is currently using (e.g., the secondary storage device 424). The storage manager 404 may then determine a second distance between the client computing device 408 and the auxiliary storage device 416. The storage manager 404 may call one or more functions of an available API for determining the distance between the client computing device 408, the secondary storage device 424, and the auxiliary storage device 416. For example, the storage manager 404 may use an API available from Skyhook Wireless Inc., located in Boston, Mass., for determining the distances between these devices. The storage manager 404 may then compare these distances to determine which storage device is closer to the client computing device 408.

Accordingly, the storage manager 404 may then instruct the client computing device 408 (e.g., one or more data agents being executed on the client computing device 408) to use the closer storage device (e.g., the auxiliary storage device 416) for creating secondary copies of primary data. In this manner, as the client computing device 408 moves from one geographical location to another geographical location, the client computing device 408 may provide location information to the storage manager 404 and, where applicable, receive a response from the storage manager 404 as to which storage device the client computing device 408 should use in creating secondary copies.

Although the foregoing example references a single auxiliary storage computing device 410 and a single secondary storage computing device 418, one of ordinary skill in the art will appreciate that multipole auxiliary storage computing devices and multiple secondary storage computing devices may be part of the information management system 402 and in communication with the various servers, devices, networks, and components illustrated in FIG. 4. Furthermore, in determining a storage device for the client computing device 408 to use in creating secondary copies, the storage manager 404 may reference the location database 406, which may include entries for the multiple auxiliary storage computing devices and entries for the multiple secondary storage computing devices.

In addition to instructing the client computing device 408 to use the auxiliary storage device 416 for creating secondary copies, the storage manager 404 may instruct the auxiliary storage computing device 410 to use the secondary storage device 424 for creating auxiliary copies. In this manner, the roles of the auxiliary storage computing device 410 and of the secondary storage computing device 418 effectively switch with regard to the primary data of the client computing device 408. The secondary storage computing device 418 may thus manage auxiliary copies of primary data of the client computing device 408, and the auxiliary storage computing device 410 may manage secondary copies of primary data of the client computing device 408. This relationship may be maintained by the storage manager 404 (e.g., in a database or other data structure).

Furthermore, and as explained above, auxiliary storage computing device 410 may synchronize the secondary copies created at the auxiliary storage device 416 with the secondary copies stored at the secondary storage computing device 418. Similarly, the secondary storage computing device 418 may synchronize any auxiliary copies stored in the secondary storage device 424 with the secondary copies stored in the auxiliary storage device 416. The secondary computing device 418 and the auxiliary storage computing device 410 may perform these synchronizations to ensure that each of the storage devices 418/424 are managing the most recent or most up-to-date secondary copy or auxiliary copy.

The synchronization of the auxiliary storage computing device 410 and the secondary storage computing device 418 may be performed based on one or more conditions. In one embodiment, the auxiliary storage computing device 410 and the secondary storage computing device 418 when the storage manager 404 determines that client computing device 408 is closer in geographical proximity to the secondary storage computing device 418 than the auxiliary storage computing device 410 after having used the auxiliary storage device 416 for storing auxiliary copies (e.g., the client computing device 408 returns to its initial geographic location near the secondary storage computing device 418). In another embodiment, the auxiliary storage computing device 410 and the secondary storage computing device synchronize at predetermined time intervals (e.g., every 24 hours, every 48 hours, etc.), after the storage manager 404 has assigned the auxiliary storage device 416 as the location where the client computing device 408 is to create secondary copies. In yet a third embodiment, the synchronization between the auxiliary storage computing device 410 and the secondary storage computing device 418 may be performed manually (e.g., by an administrator or operator of the information management system 402).

Figure 5:
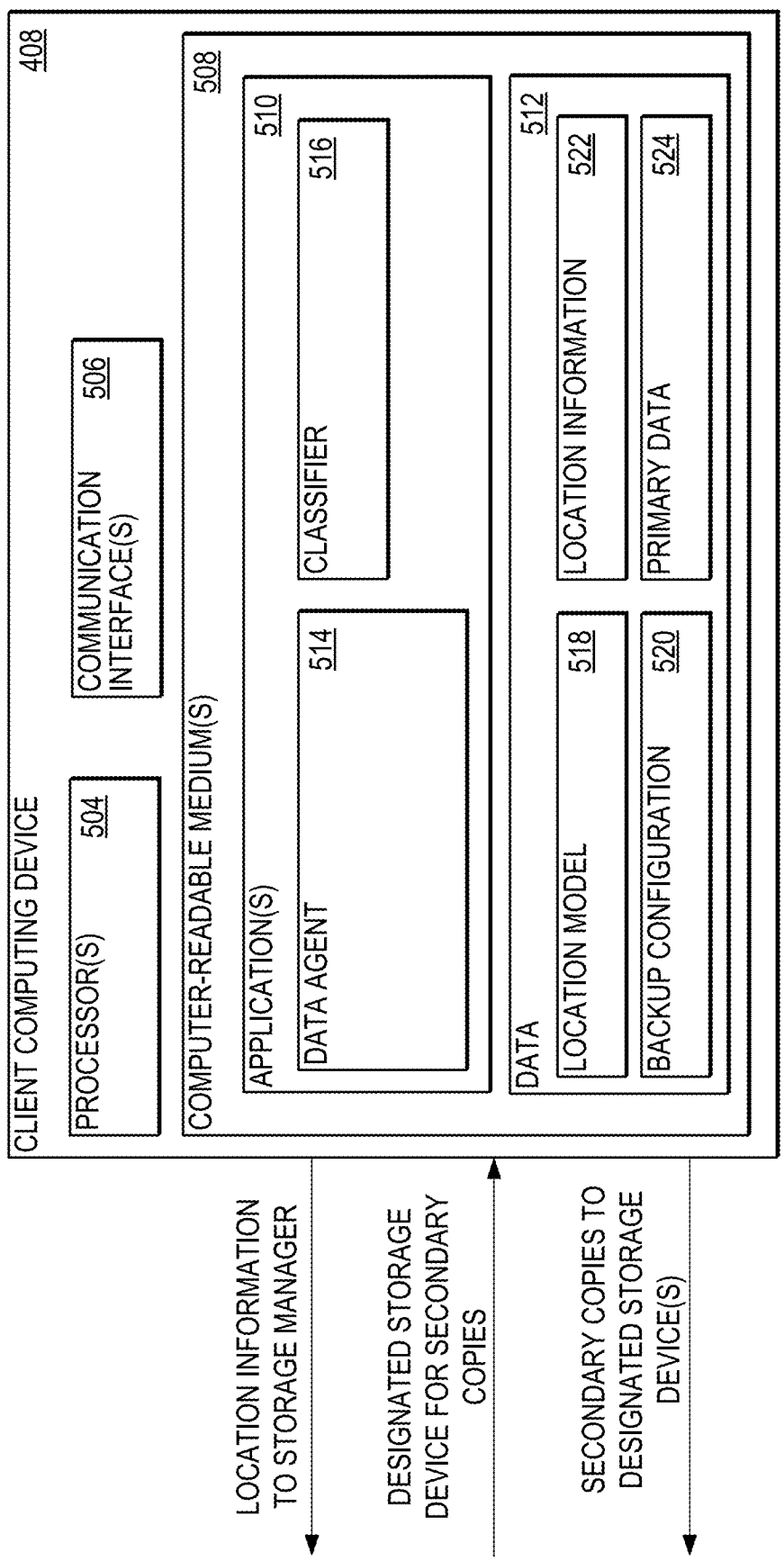
FIG. 5 illustrates the client computing device of FIG. 4 configured to support geo-location-based data replication, in accordance with an example embodiment.

Referring to FIG. 5 illustrates the client computing device 408 of FIG. 4 configured to support geo-location-based data replication, in accordance with an example embodiment. In one embodiment, the client computing device 408 is implemented similarly to the client computing device 102. That is, the client computing device 408 may be a workstation, personal computer, desktop computer, or another type of generally fixed computing system such as a mainframe computer, server, or minicomputer. The client computing device 408 may further be implemented as a mobile or portable computing device, such as a laptop, tablet computer, personal data assistant, mobile phone (such as a smartphone), or other mobile or portable computing devices such as an embedded computer, set top box, vehicle-mounted device, wearable computer, etc. The client computing device 408 may further include software typically found in a client computing device, such as an operating system, command line interface, graphical user interface, and so forth, and these components have been omitted from FIG. 4 for brevity.

The client computing device 408 may include one or more processor(s) 504 and one or more communication interface(s) 506. The one or more processor(s) 504 may be any type of commercially available processor, such as processors available from the Intel Corporation, Advanced Micro Devices, Qualcomm, Texas Instruments, or other such processors. Further still, the one or more processor(s) 504 may include one or more special-purpose processors, such as a Field-Programmable Gate Array (FPGA) or an Application Specific Integrated Circuit (ASIC). The one or more processor(s) 504 may also include programmable logic or circuitry that is temporarily configured by software to perform certain operations. Thus, once configured by such software, the one or more processor(s) 504 become specific machines (or specific components of a machine) uniquely tailored to perform the configured functions and are no longer general-purpose processors.

The one or more communication interface(s) 506 are configured to facilitate communications between the client computing device 408, one or more secondary storage devices, one or more auxiliary storage devices, and/or the storage manager 404. The one or more communication interface(s) 506 may include wired communication components, wireless communication components, cellular communication components, Near Field Communication (NFC) components, Bluetooth® components (e.g., Bluetooth® Low Energy), Wi-Fi® components, and other communication components to provide communication via other modalities.

The client computing device 408 further includes one or more computer-readable medium(s) 508 that store one or more application(s) 510 and data 512 for implementing geo-location-based data replication. The machine-readable medium(s) 508 may include one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the application(s) 510 and the data 512. Accordingly, the machine-readable medium(s) 508 may be implemented as a single storage apparatus or device, or, alternatively and/or additionally, as a "cloud-based" storage systems or storage networks that include multiple storage apparatus or devices.

In one embodiment, the application(s) 510 are written in a computer-programming and/or scripting language. Examples of such languages include, but are not limited to, C, C++, C#, Java, JavaScript, Perl, Python, or any other computer programming and/or scripting language now known or later developed.

The application(s) 510 may include a data agent 514 and a classifier 516. The data agent 514 may be implemented similarly to the data agent 142 illustrated in FIG. 1C. As shown in FIG. 4, the data agent 514 may be generally responsible for managing, initiating, or otherwise assisting in the performance of information management operations performed by one or more of the application(s) 510 and corresponding primary data 524 which is generated/accessed by the one or more application(s) 510. The data agent 514 may receive instructions from the storage manager 404 via one or more of the communication interface(s) 506.

The classifier 516 is configured accept various input signals corresponding to location information of the client computing device 408, and output one or more confidence or probability values that the client computing device 408 has made a temporary or permanent move from one location to another location. Additionally, and/or alternatively, the classifier 516 may output an absolute value (e.g., a Boolean value) as to whether the client computing device 408 has made a permanent move or a temporary move. Further still, the confidence value and/or probability values may be compared with a confidence value threshold(s) (e.g., 60%) and/or probability value threshold(s) (e.g., 0.8), and the comparison may result in the classifier 516 generating a "permanent move" output or a "temporary move" output.

The classifier 516 may be implemented as one or more machine-learning algorithms. For example, the classifier 516 may be implemented as a Naïve Bayes classifier, a Support Vector Machine (SVM) classifier, a Decision Tree, a Random Forest classifier, or any other type of classifier now known or later developed. The classifier 146 may also be implemented as a supervised or unsupervised classifier. In classifying one or more input signals, the classifier 146 may use a previously determined location model 518 to output the one or more probability or confidence values given one or more input signals corresponding to the location information of the client computing device 408.

Referring to the data 512 of the client computing device 408, the data 512 may include the location model 518 for the classifier 516, backup configuration data 520 for the data agent 514, location information 522 of the client computing device 408, and primary data 524 that is managed by the data agent 514. The data 512 may also include other data (e.g., operating system data, web server data, etc.), but such data has been omitted from FIG. 5 for the purposes of brevity and clarity.

The location model 518 may be used by the classifier 516 in determining whether a move by the client computing device 408 from one geographic location to another geographic location is a temporary move or a permanent move. In one embodiment, the location model 518 is developed by training the classifier 516 with previously labeled datasets (e.g., one or more location training datasets). The previously labeled datasets may include various combinations of input signals and whether the combination of input signals indicated that a move from a first location to a second location was a temporary move or a permanent move. The input signals (e.g., the location information) may include different types of input signals, such as calendaring information, particular SSIDs, changes in the SSID, the frequency of connecting to a particular SSID, GPS information, the frequency of change in the GPS information, network topography information (e.g., changes in discoverable networked devices), a particular Internet Protocol (IP) address assigned to the client computing device 408, the frequency of change in the IP address assigned to the client computing device 408, and other such location information or combinations thereof. Each of the previously labeled datasets may indicate whether the combination of signals indicated a temporary move or a permanent move.

The classifier 516 may obtain the one or more input signals from an application and/or operating system running on the client computing device 408. In one embodiment, the classifier 516 executes as a background process of the client computing device 408, and instantiates one or more event listener threads that listen for events triggered by various applications and/or the operating system running on the client computing device 408. The classifier 516 may instantiate a single event listener thread that listens for a variety of events triggered by the various applications and/or the operating system. In another embodiment, the classifier 516 instantiates multiple event listener threads, where each listener thread is dedicated to listening for events for particular applications and/or the operating system. The events may include an action performed by one or more of the application(s) 510 and/or a status change in the client computing device 408. Examples of different event types are discussed below.

As one example of an event type, the operating system of the client computing device 408 may generate a network connection event when the client computing device 408 connects to a network, and the network connection event may include details about the network connection, such as the IP address assigned to the client computing device 408, which network interface the client computing device 408 is using to connect to the network, the gateway for the network connection, and other such network connection details. The operating system may also generate other types of network events, such as network disconnection events, change in IP address events, or other such types of network events.

As another example of an event type, a GPS event may provide GPS coordinates for the client computing device 408. In one embodiment, the client computing device 408 is equipped with a GPS transceiver (not shown), and the operating system or other application of the client computing device 408 may periodically poll or query the GPS transceiver for GPS coordinates, where the response provided by the GPS transceiver causes the generation of the GPS event. The GPS event generated by the polling or query may include the GPS coordinates from the GPS transceiver, which may be read by one or more of the event listener threads of the classifier 516. The information obtained from an event, whether the event is a network event, a GPS event, or some other event, may be stored as part of the location information 522.

In some instances, the classifier 516 may obtain location information using ways other than an event listener thread. For example, the classifier 516 may access an API or other interface to one or more of the application(s) 510 of the client computing device 408 that provides location information. In some cases, a calendar application, scheduling application, task managing application, or other similar application, may provide an API that allows external applications to query and/or obtain location information from the application. One example of a calendar application that provides an API for access by external applications is Microsoft® Outlook®, which is available from the Microsoft Corporation located in Redmond, Wash. The API of the calendar application may provide access to various types of calendaring information such as one or more calendar appointments, the geographic location of a calendar appointments, the postal address for the calendar appointment, the duration of the calendar appointments, and other such calendaring information. In addition, the classifier 516 may use the API to determine whether the client computing device 408 will move from one location (e.g., an origin) to a second location (e.g., a destination), and whether the client computing device 408 will be returning to the origin from the destination (e.g., by identifying a calendar appointment with the original origin as the destination and the original destination as the origin). The information obtained from the calendar application may be stored as part of the location information 522.

While the foregoing example references a calendar application, other applications may be used to provide location information via an API or other interface. For example, a flight booking application may provide information about flight information for the user of the client computing device 408, an e-mail application may provide location information from e-mailed reminders of upcoming travel arrangements, a database application may provide location information from one or more database entries, and so forth. Thus, the manner in which the classifier 516 obtains location information 522 from one or more application(s) 510 is not limited to the methodologies disclosed herein, but may use one or more techniques now known or later developed.

In obtaining the location information of the client computing device 408, the classifier 516 may display a prompt or other message on a graphical user interface provided by the operating system of the client computing device 408 that requests authorization from the user that the classifier 516 may obtain such location information (e.g., the user "opts into" the collection of the location information). In other instances, the location information of the client computing device 408 may be classified into publicly available location information and private location information, and the classifier 516 may initially have access to the publicly available location information. One example of publicly available location information is the IP address of the client computing device 408 or the SSID of the network to which the client computing device 408 is connected (e.g., where the client computing device 408 uses a wireless network connection). For private location information, the classifier 516 may display a prompt or message that the classifier 516 collects limited public information about the client computing device 408 (e.g., the IP address), but that the user must provide authorization to the classifier 516 to collect the private location information. Whether the location information is public location information or private location information, the location information may be stored as part of location information 522.

The classifier 516 may collect the location information 522 periodically from the client computing device 408. For example, the classifier 516 may be configured to collect and/or obtain the location information 522 at predetermined time intervals. Examples of predetermined time intervals include every 24 hours, once every three days, once a week, and so forth. In addition, a detected change in the location of the client computing device 408 may cause a reset in counting down the predetermined time period. For example, where the classifier 516 determines that the client computing device 408 has moved from a first location to a second location, the determination may cause the classifier 516 to reset the predetermined time period. After the reset of the predetermined time period, the classifier 516 may then wait for the predetermined time period to expire before collecting and/or obtaining the location information 522 from the various application(s) 510.

The location information obtained by the classifier 516 may be input into the location model 518. In response, the location model 518 may output a probability or confidence value that the client computing device 408 has permanently or temporarily moved. However, there may be instances where the probability or confidence value is perceived as too high, too low, or incorrect. For example, the user of the client computing device 408 may decide to refine the location model 518, and to view the outputs produced by the classifier 516. For example, where the classifier 516 outputs a particular value (e.g., the confidence value and/or the absolute value), a user of the client computing device 408 may be given the opportunity to provide feedback as to whether the output value was correct. The user of the client computing device 408 may then input an affirmative or negatory feedback value indicating whether the output value of the classifier 516 was correct. Where the feedback value input by the user is in the affirmative, the classifier 516 may take no action on the location model 518. In contrast, where the feedback value input by the user is in the negatory, the classifier 516 may perform a re-training of the location model 518 using the location information 522 and the feedback provided by the user.

As explained previously, the location of the client computing device 408 may affect the time required to backup primary data 524 from and/or restore data to the client computing device 408. The location may affect the backup and/or restore operations due to the distances between the client computing device 408 and its designated secondary storage location. As the distance between the client computing device 408 and its designated secondary storage location increases, the latency between the client computing device 408 and the secondary storage devices may also increase.

However, where the distance between the client computing device 408 and the secondary storage devices increases, the client computing device 408 may be closer to an auxiliary storage location. To recall, an auxiliary storage location may be a location where an auxiliary copy is created from secondary data stored at one or more secondary storage devices. Accordingly, the output by the classifier 516 may be provided to and/or read by the data agent 514, which may transmit or send a message to the storage manager 404 for obtaining an assignment of a designated secondary storage location. In one embodiment, the data 512 includes backup configuration data 520, where the backup configuration data 520 implements one or more information management policies communicated by the storage manager 404 in communication with the client computing device 408. The backup configuration data 520 may instruct the data agent 514 how to manage backup operations including, but not limited to, the primary data 524 to be backed up by the data agent 514, a destination storage device for backing up primary data 524, datapath information specifying how the backed up data will be communicated to the destination, the type of secondary copy operation to be performed, and the retention information specifying how long the data will be retained at the destination.

In one embodiment, the data agent 514 communicates a message to the storage manager 404 each time the client computing device 408 moves to a new geographic location. In this embodiment, communicating this message to the storage manager 404 provides up-to-date location information for the client computing device 408. This message may also include a flag or identifier indicating whether the move to the new geographic location is a temporary or permanent move. As discussed above, the storage manager 404 may communicate a reply to the client computing device 408, where the reply includes the designation of a storage device to use for creating secondary copies of the primary data 524. For example, where the message includes an indication that the move by the client computing device 408 is a permanent move, and the storage manager 404 determines that the client computing device 408 is geographically closer to the auxiliary storage device 416, the storage manager 404 may send a reply to the client computing device 408 that includes an instruction to the use the auxiliary storage device 416 for secondary copies. The instruction from the storage manager 404 may modify the backup configuration data 520 associated with the data agent 514.

In another embodiment, the client computing device 408 may send the message to the storage manager 404 after the classifier 516 has determined whether the move by the client computing device 408 was a temporary move or a permanent move. In this embodiment, the client computing device 408 sends a communication to the storage manager 404 when the client computing device 408 moves to a new geographical location, and then sends a second message to the storage manager 404 after the classifier 516 has generated an output indicating whether the move was (or was likely) a temporary move or a permanent move. The second message sent by the client computing device 408 may include the indication of whether the move was a temporary or permanent move, and may also include a request to assign (or re-assign) a storage device for creating secondary copies of the primary data 524. In response to this second message, the storage manager 404 may determine which storage computing device is geographically closer to the client computing device 408, and then send a message to the client computing device 408 with the assignment of the determined storage computing device. In some instances, the determined storage computing device may change (e.g., where the client computing device 408 moves geographically closer to a different storage computing device); in other instances, the determined storage computing device may remain the same (e.g., where the client computing device 408 is closer to its currently assigned storage computing device even after the move).

Figure 6A:
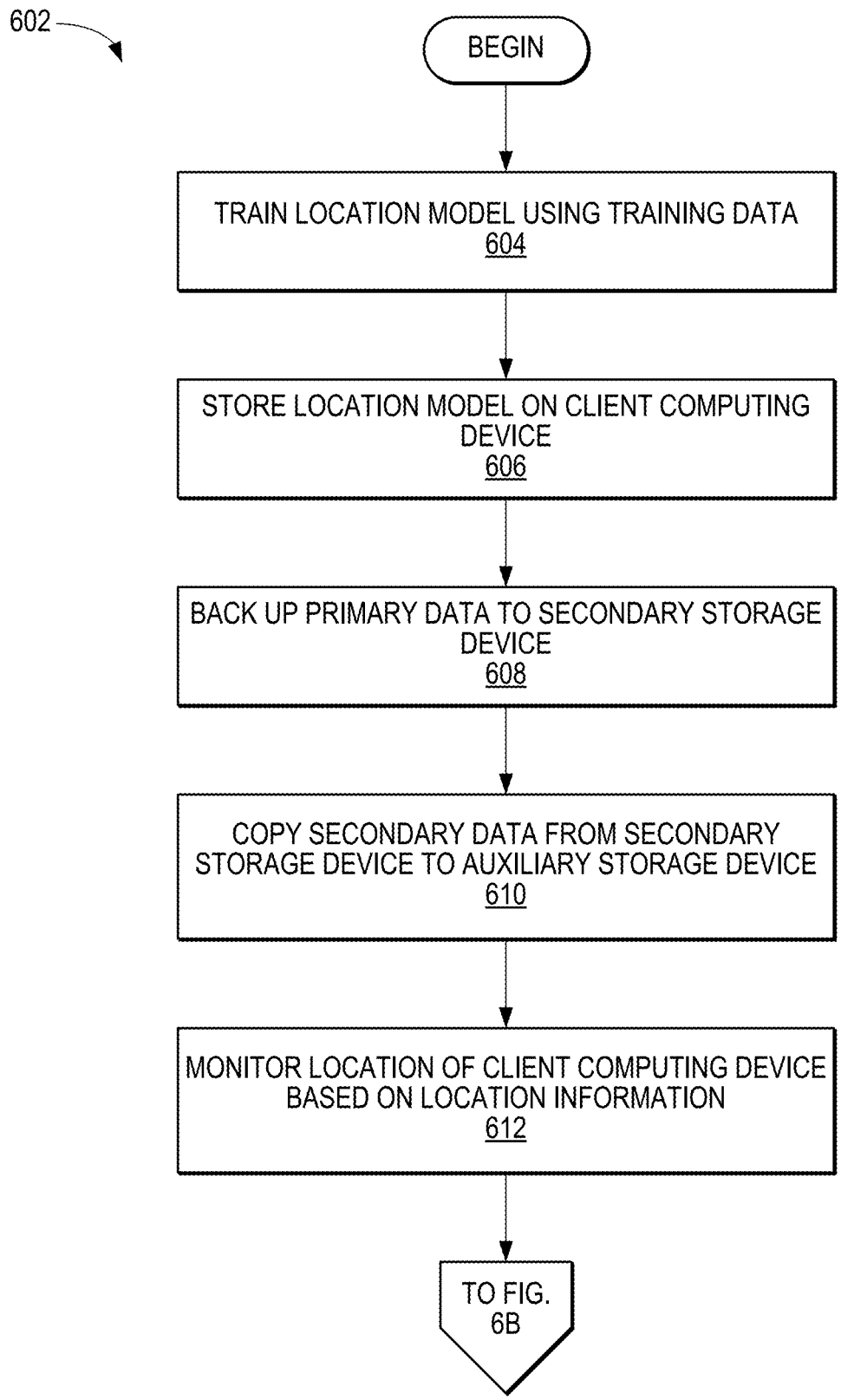
FIGS. 6A-6C illustrate a method, in accordance with an example embodiment, for implementing geo-location-based data replication in the information management system of FIG. 4.
Figure 6B:
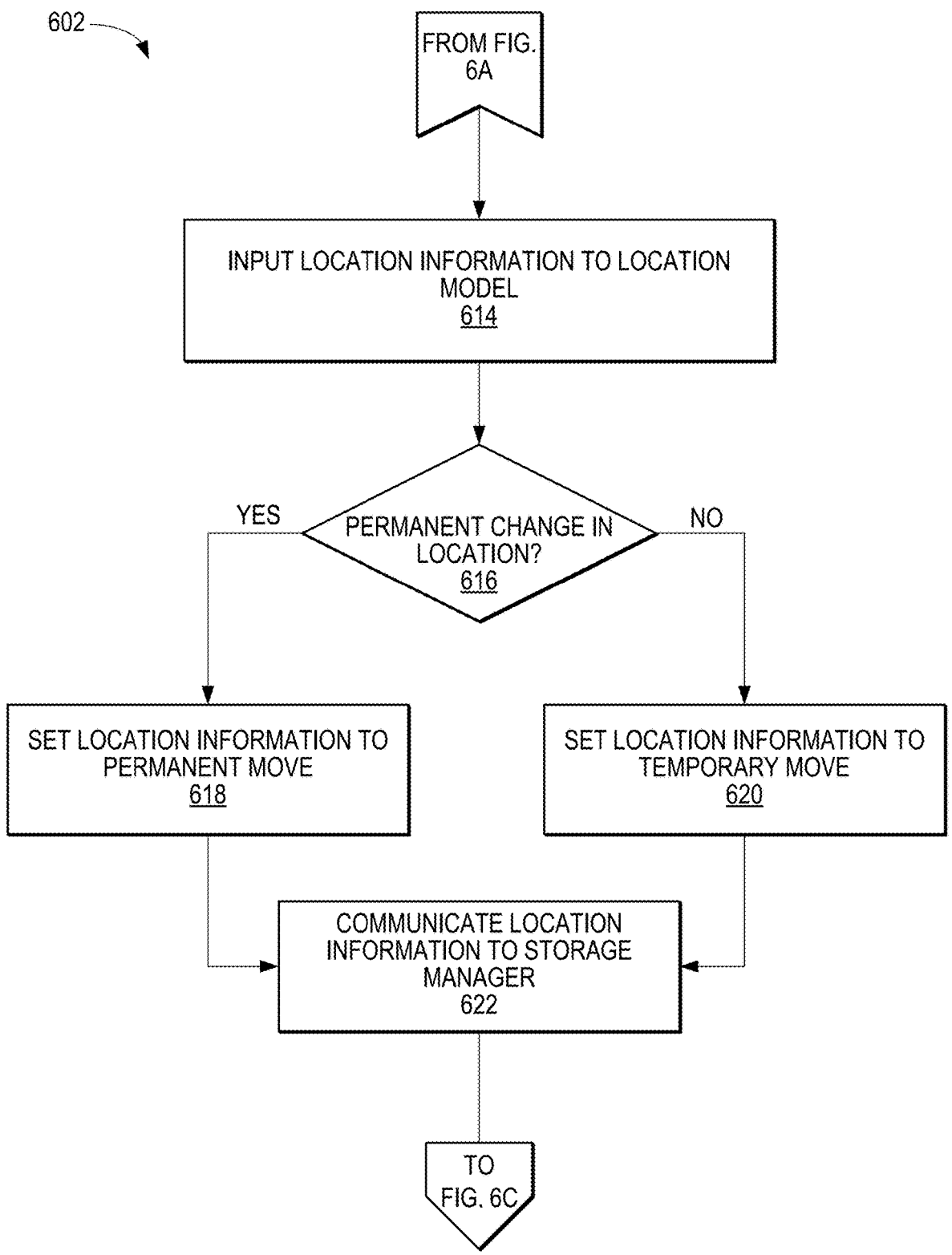
Figure 6C:
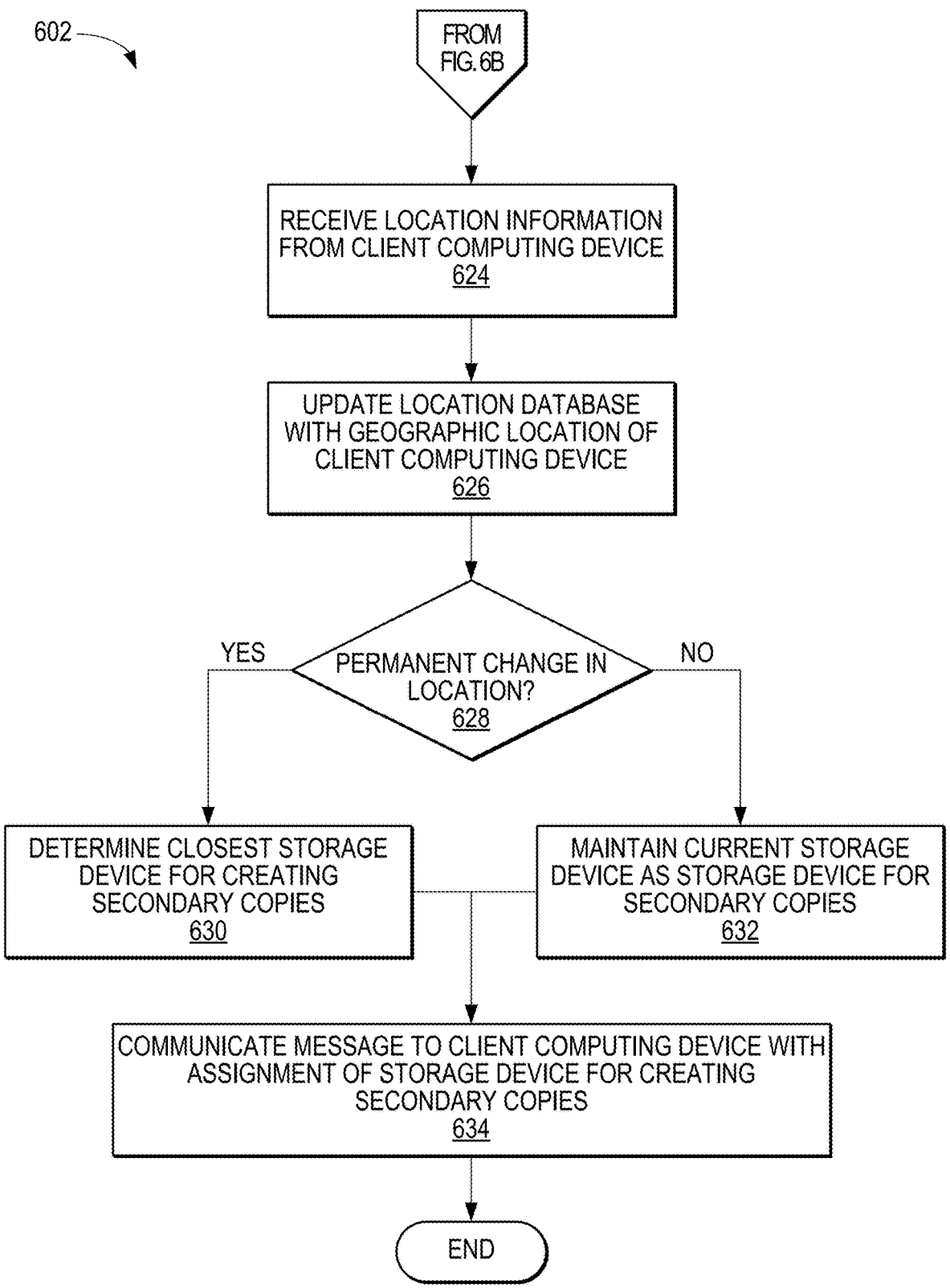

FIGS. 6A-6C illustrate a method 602, in accordance with an example embodiment, for implementing geo-location-based data replication in the information management system 402 of FIG. 4. The method 602 may be performed by one or more of the devices and/or components illustrated in FIGS. 3-5, and is discussed by way of reference thereto.

Referring initially to FIG. 6A, the classifier 516 of the client computing device 408 may be trained with a training set of data (Operation 604). As discussed above, the classifier 516 may be initially trained with one or more training data sets, where the training data sets include signals that indicate whether a client computing device is likely to remain at a particular location and, if so, the amount of time that the client computing device may spend at the particular location. The training data sets may further include associations between input signals and whether a move by the client computing device was a temporary move or a permanent move. Additionally, the training data sets may include associations between one or more input signals and probability values that the move by the client computing device was a temporary move or a permanent move. The training data sets may originate through empirical testing, crowdsourcing experimentation, focus group studies, other sources, or combinations thereof. The initial training of the classifier 516 may yield the location model 518, which may be transferred to the client computing device 408 via one or more of the communication interface(s) 506 (Operation 606).

The client computing device 408 may then be used by the user of the client computing device 408. Depending on one or more information management policies of the storage manager 404, the client computing device 408 may back up primary data 524 to the secondary storage device 424 (Operation 608). Similarly, the secondary storage computing device 418 may then create one or more auxiliary copies of the primary data at the auxiliary storage device 416 according to one or more information management policies implemented by the storage manager 404 (Operation (610). Creating secondary copies and auxiliary copies is discussed at length with reference to Figures X-Y, above.

During operation of the client computing device 408, one or more components of the client computing device 408 may monitor its location (Operation 612). For example, the data agent 514 and/or the classifier 516 may be configured to monitor the location of the client computing device 408. Monitoring the location of the client computing device 408 may include collecting publicly available location information and/or private location information about the client computing device 408. Publicly available location information may include, but is not limited to, network connection information for wireless networks, Bluetooth® connections with Bluetooth®-enabled devices, IP address information, and other publicly available location information or combinations thereof. Private location information may include, but is not limited to, SSIDs of wireless networks, GPS coordinates, address information for meeting appointments, and other types of private location information or combinations thereof. Furthermore, prior to collecting the private location information, the client computing device 408 may display a prompt or message requesting authorization to collect the private location information. Where the authorization is not received, the client computing device 408 may not collect the private location information.

As a user uses the client computing device 408, the user may move the client computing device 408 from a first geographic location to a second geographic location. As the client computing device 408 moves from the first geographic location to the second geographic location, the data agent 514 may detect the change in location (e.g., a change in the GPS coordinates of the client computing device 408, a connection to a different SSID, a new IP address that is associated with a different geographic location, and so forth). Upon detection of the change in location, the data agent 514 may wait for a predetermined time period before executing or invoking the classifier 516 to provide an indication as to whether the move was a temporary or permanent move. In one embodiment, the predetermined time period may be a one-week time period. In another embodiment, the predetermined time period may be five days. The predetermined time period may be established in a variety of ways including, but not limited to, by the user of the client computing device 408, provided by the storage manager 404 via one or more information management policies, via a developer of the data agent 514, and so forth. Waiting for the predetermined time period to elapse may be helpful because, in some instances, the client computing device 408 may only be at the second geographic location for a short time period (e.g., a day, 24 hours, 12 hours, etc.), and determining whether the client computing device 408 has made a temporary or permanent move may be a waste of computing resources. In addition, the client computing device 408 may still be in-transit, and waiting for the predetermined time period to elapse ensures that the client computing device 408 has come to rest at its intended geographic location. In an alternative embodiment, there is no predetermined time period, and the data agent 514 determines whether the move by the client computing device 408 is a temporary or permanent move upon detection that the client computing device 408 has changed its geographic location.

Referring to FIG. 6B, the data agent 514 provides the various location information 522 (e.g., publicly available location information and/or private location information) to the classifier 516 (Operation 614). As discussed above, the location information 522 may include various input signals that the classifier 516 uses, along with the location model 518, to output an indication as to whether the move by the client computing device 408 was a temporary move or a permanent move. As also previously explained, the classifier 516 may be implemented as a machine-learning algorithm (or combination of machine-learning algorithms) and uses the location model 518 as part of the machine-learning algorithm in generating an output (Operation 616). The output may associate possible "moving" values (e.g., temporary, permanent, etc.), where each value is associated with a probability value. In an alternative embodiment, the output may be an absolute or deterministic value (e.g., "temporary" or permanent). In yet a further embodiment, the data agent 514 may compare the one or more probability values output by the classifier 516, and compare the one or more probability values with a probability value threshold (e.g., 80%). Where the one or more probability values meet or exceed the probability value threshold, the data agent 514 may associate the outcome (e.g., temporary or permanent) with the move by the client computing device 408.

Where the output from the classifier 516 indicates that the move is a permanent move (e.g., the "YES" branch of Operation 616), the method 602 proceeds to Operation 618. At Operation 618, the data agent 514 associates the move of the client computing device 408 with a permanent change in its geographic location. In contrast, where the output from the classifier 516 indicates that the move is a temporary move (e.g., the "NO" branch of Operation 616), the method 602 proceeds to Operation 620. At Operation 620, the data agent 514 associates the move of the client computing device 408 with a temporary change in its geographic location (Operation 620). The data agent 514 may then transmit a message or communication to the storage manager 404 to update the storage manager 404 as to the location of the client computing device 408 (Operation 622). Although FIG. 6B illustrates Operation 622 occurring after a determination has been made as to the type of move, Operation 622 may occur before the determination has been made, where the message or communication to the storage manager 404 informs the storage manager 404 that the client computing device 408 has moved. The data agent 514 may then send a subsequent message or communication to the storage manager 404 (e.g., after the predetermined time period has elapsed) informing the storage manager 404 as to the type of move that has occurred.

Referring next to FIG. 6C, the storage manager 404 receives the message or communication from the data agent 514 with the location information about the client computing device 408 (Operation 624). As discussed above, the message or communication may include a notification that the client computing device 408 has moved, the location information about the move by the client computing device 408 (e.g., GPS coordinates, an address, one or more SSIDs, an IP address, etc.), and whether the move was a temporary move or a permanent move. Based on the message or communication, the storage manager 404 may then update the location database 406 with the location information for the client computing device 408 (Operation 626). As explained previously, the storage manager 404 may reference the location database 406 to determine the location of the client computing device 408 and the location of any other client computing device(s) that may be part of the information management system 402.

The storage manager 404 may then reference the communication or message to determine whether the change in the geographic location of the client computing device 408 was a temporary change or a permanent change (Operation 628). Where the storage manager 404 determines that the change was a permanent change in the geographic location (e.g., the "YES" branch of Operation 628), the method 602 proceeds to Operation 630. At Operation 630, the storage manager 404 determines a closest storage device the client computing device is to use for creating secondary copies of its primary data 524. In one embodiment, the storage manager 404 performs this determination by determining the geographic location of the client computing device 408, and then finding a storage device located at a geographic location that is the closest to the geographic location of the client computing device 408. In some instances, the storage device may be an auxiliary storage device (e.g., the auxiliary storage device 416) managed by an auxiliary storage computing device (e.g., the auxiliary storage computing device 410). In other instances, the storage device may be the same as the current device that the data agent 514 uses to create secondary copies (e.g., the secondary storage device 424). The storage device may also be a different secondary storage device that is geographically closer to the client computing device 408. The storage manager 404 may then update one or more information management policies with the assignment of the determined storage device to the data agent 514.

Referring back to Operation 628, where the storage manager 404 determines that the change in location was a temporary change (e.g., the "NO" branch of Operation 628), the method 602 proceeds to Operation 632. At Operation 632, the storage manager 404 maintains the association between the data agent 514 and its currently assigned storage device for creating secondary copies (e.g., the secondary storage device 424). The storage manager 404 may maintain this association as the move was temporary and the client computing device 408 may be moved again to another geographic location or may be moved back to its prior geographic location. Thus, where the storage manager 404 determines that the change in geographic location was temporary, the storage manager 404 may not change the storage device that the data agent 514 uses to create secondary copies.

At Operation 634, the storage manager 404 transmits a message or communication to the data agent 514 informing the data agent 514 of the storage device to use in creating secondary copies. In some instances, the message or communication changes which storage device the data agent 514 is to use in creating secondary copies. In other instances, the message or communication does not change the storage device that the data agent 514 uses to create secondary copies. Based on this message, the data agent 514 then creates secondary copies at the assigned storage device.

Figure 7:
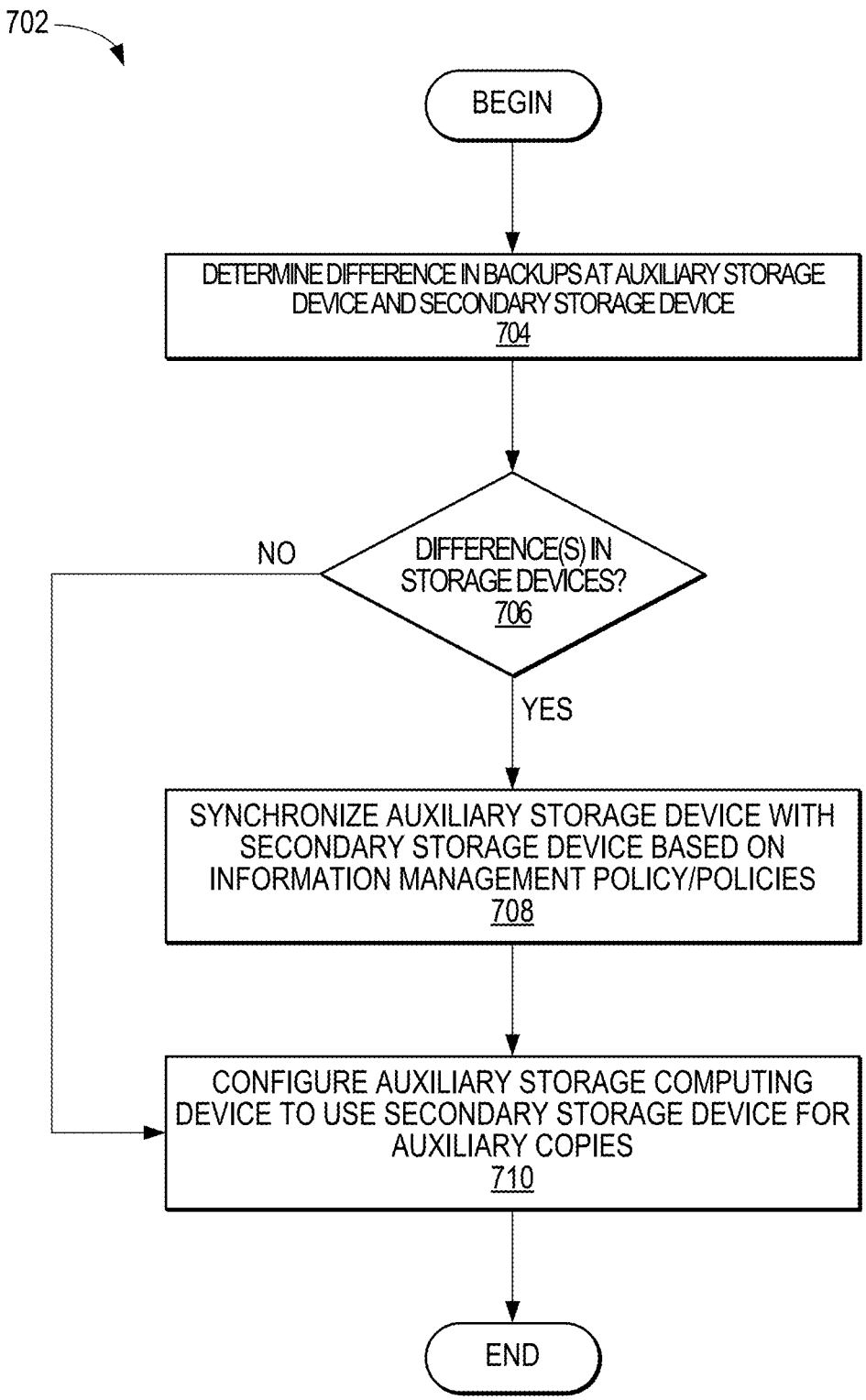
FIG. 7 illustrates a method, in accordance with an example embodiment, for synchronizing the auxiliary storage device and the secondary storage device of the information management system of FIG. 4.

FIG. 7 illustrates a method 702, in accordance with an example embodiment, for synchronizing the auxiliary storage device 416 and the secondary storage device 424 of the information management system 402 of FIG. 4. The method 702 may be implemented by one or more of the devices or components illustrated in FIGS. 4-5 and is discussed by way of reference thereto.

In method 702, the auxiliary storage device 416 has been assigned the storage device for the data agent 514 to use in creating secondary copies. The method 702 may be initiated shortly after, or subsequent to, the auxiliary storage device 416 being assigned the storage device for the data agent 514 to use in creating the secondary copies. In one embodiment, the storage manager 404 implements an information management policy where the designated storage device is required to maintain a predetermined number of secondary copies of the primary data for the client computing device 408. In this embodiment, each of the secondary copies may be associated with a particular date, where each date occurs earlier in time. In this way, the storage device may include a number of secondary copies, where each copy is an earlier copy of the primary data 524.

To ensure that the auxiliary storage device 416 has the requisite number of secondary copies, the storage manager 404 may initiate, or may instruct the auxiliary storage computing device 410 to initiate, a synchronization operation with the secondary storage computing device 418 (e.g., the storage device that was previously assigned the storage device to store secondary copies of the primary data 524). In one embodiment, the synchronization operation begins with determining whether there are differences in the secondary copies stored by the auxiliary storage device 416 and the secondary storage device 424 (Operation 704). In this operation, the differences may be based on which secondary copies are stored by the auxiliary storage device 416 and which secondary copies are stored by the secondary storage device 424. For example, the auxiliary storage device 416 may include fewer secondary copies that are specified by the information management policy (e.g., the information management policy requires that the auxiliary storage device 416 include the four most recent secondary copies, but the auxiliary storage device 416 only has the two secondary copies that were created much earlier in time). Accordingly, where there is a difference between the secondary copies of the auxiliary storage device 416 and the secondary storage device 424 (e.g., the "YES" branch of Operation 806), the storage manager 404 and/or the auxiliary storage computing device 410 may copy the secondary copies from the secondary storage device 424 to the auxiliary storage device 416 (Operation 708).

A similar synchronization may occur with the secondary storage device 424. As the auxiliary storage device 416 is to be configured to store secondary copies, the secondary storage device 424 is to be configured to store auxiliary copies of the secondary copies. Accordingly, Operation 706 may also include determining whether there are differences in the auxiliary copies stored by the auxiliary storage device 416 and the auxiliary copies stored by the secondary storage device 424. For example, in one embodiment, an information management policy may specify the number of auxiliary copies to be stored by the storage device designated as the auxiliary storage device. In this case, as the secondary storage device 424 is to be designated the auxiliary storage device for the auxiliary storage device 416, the differences may be based on whether the secondary storage device 424 includes the requisite number of auxiliary copies. Thus, where there is a difference between the auxiliary storage device 416 and the secondary storage device 424 based on the auxiliary copies stored in the secondary storage device 416 (e.g., the "YES" branch of Operation 706), the storage manager 404 and/or the secondary storage computing device 418 may copy over the auxiliary copies from the auxiliary storage device 416 to the secondary storage device 424 (Operation 708). If there are no differences in the secondary copies and/or the auxiliary copies of the secondary storage device 424 and the auxiliary storage device 416 (e.g., the "NO" branch of Operation 806), the method 802 may proceed to Operation 710.

After the synchronization is complete, the storage manager 404 may then instruct the auxiliary storage computing device 410 to use the secondary storage device 424 for creating and/or storing auxiliary copies (Operation 710). Although the foregoing operations describe synchronization as being based on both the secondary copies stored at the auxiliary storage device 416 and the auxiliary copies stored at the secondary storage device 424, the preceding synchronization operations may be performed based solely on the auxiliary copies or solely on the secondary copies. Thus, depending on the implementation of method 702, the synchronization between the secondary storage device 424 and the auxiliary storage device 416 may occur based on the secondary copies stored at the auxiliary storage device 416, the auxiliary copies stored at the secondary storage device 424, or both.

Figure 8:
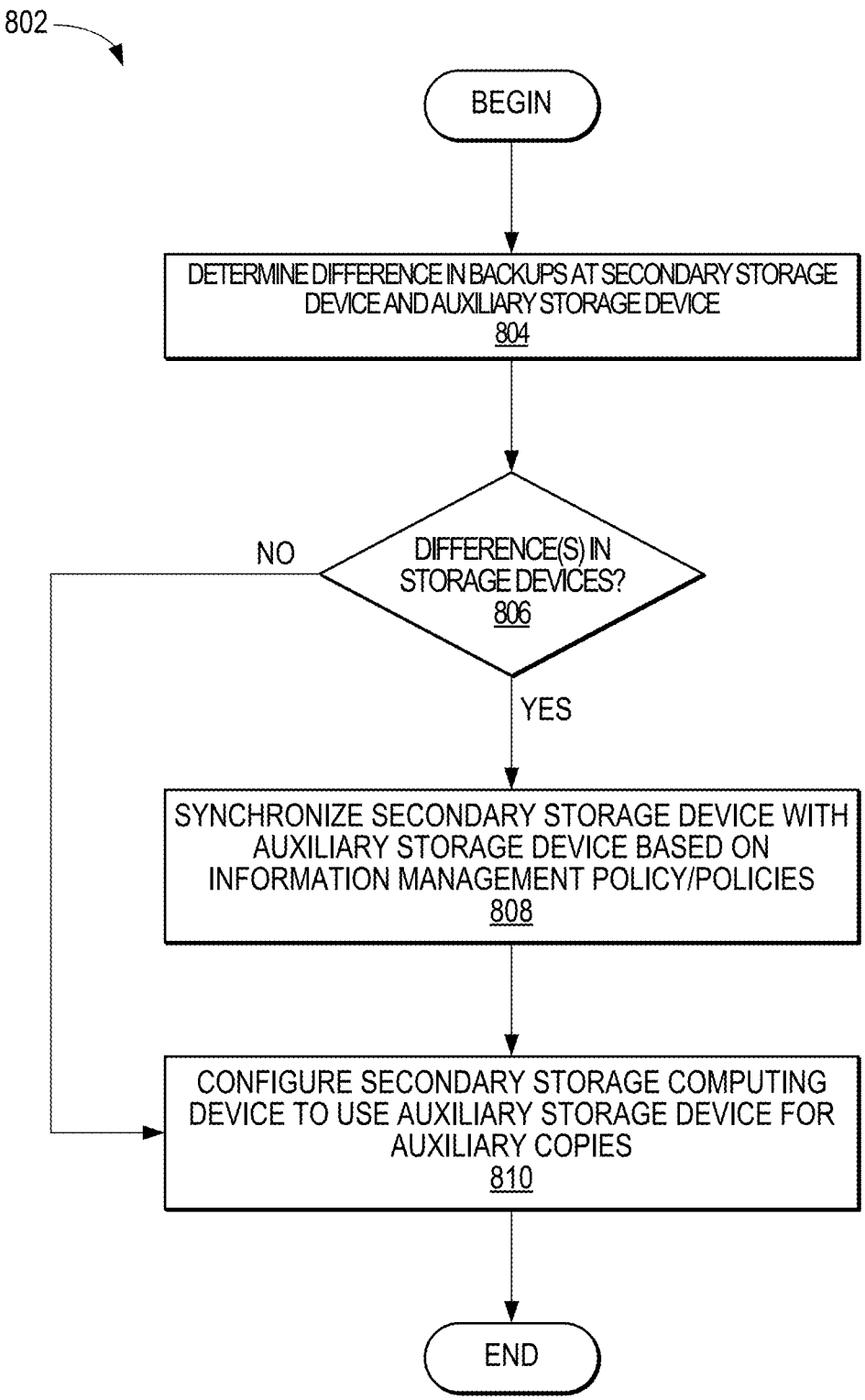
FIG. 8 illustrates a method, in accordance with an example embodiment, for synchronizing the auxiliary storage device and the secondary storage device of the information management system of FIG. 4.

FIG. 8 illustrates a method 802, in accordance with an example embodiment, for synchronizing the secondary storage device 424 and the auxiliary storage device 416 of the information management system 402 of FIG. 4. The method 802 may be implemented by one or more of the devices or components illustrated in FIGS. 4-5 and is discussed by way of reference thereto.

In method 802, storage manager 404 may have re-assigned the secondary storage device 424 as the storage device for the data agent 514 to use in creating secondary copies. In this regard, the storage manager 404 may have previously assigned the auxiliary storage device 416 as the storage device to use in creating secondary copies, but the client computing device 408 has since moved to a geographic location closer to the secondary storage device 424. Accordingly, the method 802 may be initiated shortly after, or subsequent to, the secondary storage device 424 being assigned the storage device for the data agent 514 to use in creating the secondary copies. In one embodiment, the storage manager 404 implements an information management policy where the designated storage device is required to maintain a predetermined number of secondary copies of the primary data for the client computing device 408. In this embodiment, each of the secondary copies may be associated with a particular date, where each date occurs earlier in time. In this way, the storage device may include a number of secondary copies, where each copy is an earlier copy of the primary data 524.

To ensure that the secondary storage device 424 has the requisite number of secondary copies, the storage manager 404 may initiate, or may instruct the secondary storage computing device 418 to initiate, a synchronization operation with the auxiliary storage computing device 410 (e.g., the storage device that was previously assigned the storage device to store secondary copies of the primary data 524). In some instances, the auxiliary storage device 416 may store secondary copies that are not present at the secondary storage device 424 and the synchronization operation ensures that the secondary storage device 424 includes the most recent, or up-to-date, secondary copies.

In one embodiment, the synchronization operation begins with determining whether there are differences in the data stored by the secondary storage device 424 and the data stored by the auxiliary storage device 416 (Operation 804).

In this operation, the differences may be based on which secondary copies are stored by the secondary storage device 424 and which secondary copies are stored by the auxiliary storage device 416. For example, the secondary storage device 424 may include fewer secondary copies that are specified by the information management policy (e.g., the information management policy requires that the secondary storage device 424 include the four most recent secondary copies, but the secondary storage device 424 only has two secondary copies that were created at a much earlier point in time). Accordingly, where there is a difference between the secondary copies of the secondary storage device 424 and the auxiliary storage device 416 (e.g., the "YES" branch of Operation 806), the storage manager 404 and/or the secondary storage computing device 418 may copy over the secondary copies from the auxiliary storage device 416 to the secondary storage device 424 (Operation 808).

A similar synchronization may occur with the secondary storage device 424. As the secondary storage device 424 is again to be configured to store secondary copies, the auxiliary storage device 416 is to be configured to store auxiliary copies of the secondary copies. Accordingly, Operation 706 may also include determining whether there are differences in the auxiliary copies stored by the auxiliary storage device 416 and the auxiliary copies stored by the secondary storage device 424. For example, in one embodiment, an information management policy may specify the number of auxiliary copies to be stored by the storage device designated as the auxiliary storage device. In this case, as the auxiliary storage device 416 is to be designated the auxiliary storage device for the secondary storage device 424, the differences may be based on whether the auxiliary storage device 416 includes the requisite number of auxiliary copies. Thus, where there is a difference between the auxiliary storage device 416 and the secondary storage device 424 based on the auxiliary copies stored in the auxiliary storage device 416 (e.g., the "YES" branch of Operation 806), the storage manager 404 and/or the auxiliary storage computing device 410 may copy over the auxiliary copies from the secondary storage device 424 to the auxiliary storage device 416 (Operation 708). Where there is no difference between the secondary copies and/or the auxiliary copies stored in the auxiliary storage device 416 and the secondary storage device 424 (e.g., the "NO" branch of Operation 806), the method 802 may proceed to Operation 810.

After the synchronization is complete, the storage manager 404 may then instruct the secondary storage computing device 418 to use the auxiliary storage device 416 for creating and/or storing auxiliary copies (Operation 810). Although the foregoing operations describe synchronization as being based on both the secondary copies stored at the secondary storage device 424 and the auxiliary copies stored at the auxiliary storage device 416, the preceding synchronization operations may be performed based solely on the auxiliary copies or solely on the secondary copies. Thus, depending on the implementation of method 802, the synchronization between the secondary storage device 424 and the auxiliary storage device 416 may occur based on the secondary copies stored at the auxiliary storage device 416, the auxiliary copies stored at the secondary storage device 424, or both.

In this manner, the foregoing description provides an information management system that implements a geo-location-based data replication environment. A storage manager (e.g., storage manager 404) may initially assign a secondary storage device (e.g., secondary storage device 424) to a client computing device (e.g., the client computing device 408) for storing secondary copies. However, as the client computing device moves away from the secondary storage device, the time required to create the secondary copies may also increase. Furthermore, the increase in distance may also increase the time required to restore primary data to the client computing device from the secondary copies stored in the secondary storage device. In response to the client computing device moving, the storage manager may determine that an auxiliary storage device is geographically closer to the client computing device after the client computing device moves. Accordingly, the storage manager may instruct the client computing device to use the auxiliary storage device for storing secondary copies, and then may later synchronize the auxiliary storage device and the secondary storage device to ensure that each storage device includes the requisite number of secondary copies and/or auxiliary copies.

An additional challenge to the disclosed implementation is that the client computing device may be moved temporarily farther away from the secondary storage device. Thus, it may not be desirable to implement the foregoing changes to the client computing device, auxiliary storage device, and the secondary storage device if the change in geographical location of the client computing device is temporary. To determine whether the change in geographical location is permanent or temporary, the client computing device may implement a machine-learning algorithm that uses various input signals from the client computing device to output a probability value, confidence value, and/or absolute value that the move was permanent or temporary. The client computing device may include the output from the machine-learning algorithm in a request to the storage manager for a storage device to use in storing secondary copies. Thus, the machine-learning algorithm of the client computing device reduces the potential loss in computing resources that would incur if the storage manager performed re-assignment and/or synchronization operations as if the client computing device had made a permanent move, when, in fact, the client computing device had made a temporary move.

EXAMPLE EMBODIMENTS

Some example enumerated embodiments of the present invention are recited in this section in the form of methods, systems, and non-transitory computer-readable media, without limitation.

In one embodiment, this disclosure provides a method for managing an auxiliary data location and a secondary data location, wherein the method comprises synchronizing secondary copy data stored at a first secondary data location to a first auxiliary data location to obtain auxiliary copy data from the secondary copy data, wherein the secondary copy data is backed up from primary data stored at a client computing device, determining whether the client computing device has permanently moved from a first location to a second location, wherein the first location is associated with the first secondary data location and the second location is associated with the first auxiliary data location, and in response to the determination that the client computing device has permanently moved from the first location to the second location: designating the first auxiliary data location as a second secondary data location, and designating the first secondary data location as a second auxiliary data location. The method also comprises configuring the client computing device to back up primary data to the second secondary data location, and backing up the primary data stored at the client computing device to the second secondary data location to obtain updated secondary copy data.

In another embodiment of the method, the determining whether the client computing device has permanently moved from the first location to the second location is based on location information obtained from the client computing device.

In a further embodiment of the method, the location information comprises a first set of Global Positioning System (GPS) coordinates associated with the first location and a second set of GPS coordinates associated with the second location.

In yet another embodiment of the method, the method comprises training a machine-learning model with a location training dataset, wherein the location training dataset comprises location information that indicates whether a move from the first location to the second location should cause the configuring of the client computing device; and, wherein: determining whether the client computing device has permanently moved from a first location to a second location comprises determining a probability value that the client computing device has permanently moved from the first location to the second location based on location information obtained from the client computing device and input to the machine-learning model, and comparing the determined probability value with a probability threshold value that indicates a likelihood that the client computing device has permanently moved.

In yet a further embodiment of the method, the machine-learning model is updated with additional location information based on feedback that the determined probability value is incorrect.

In another embodiment of the method, the method comprises restoring auxiliary copy data from the second secondary data location after the determination that the determined probability value is greater than the probability value threshold.

In a further embodiment of the method, the method comprises determining whether there is a difference in the auxiliary copy data and the secondary copy data, and wherein the synchronizing of the auxiliary copy data and the secondary copy data is based on a determined difference in the auxiliary copy data and the secondary copy data.

This disclosure further provides for a system for managing an auxiliary data location and a secondary data location, the system comprising one or more non-transitory, computer-readable media having computer-executable instructions stored thereon, and, one or more processors that, having executed the computer-executable instructions, configure the system to perform a plurality of operations. The plurality of operations comprises synchronizing secondary copy data stored at a first secondary data location to a first auxiliary data location to obtain auxiliary copy data from the secondary copy data, wherein the secondary copy data is backed up from primary data stored at a client computing device, and determining whether the client computing device has permanently moved from a first location to a second location, wherein the first location is associated with the first secondary data location and the second location is associated with the first auxiliary data location. The plurality of operations also comprises, in response to the determination that the client computing device has permanently moved from the first location to the second location, designating the first auxiliary data location as a second secondary data location, and designating the first secondary data location as a second auxiliary data location. The plurality of operations also comprises configuring the client computing device to back up primary data to the second secondary data location, and backing up the primary data stored at the client computing device to the second secondary data location to obtain updated secondary copy data.

In another embodiment of the system, the determining whether the client computing device has permanently moved from the first location to the second location is based on location information obtained from the client computing device.

In a further embodiment of the system, the location information comprises a first set of Global Positioning System (GPS) coordinates associated with the first location and a second set of GPS coordinates associated with the second location.

In yet another embodiment of the system, the plurality of operations further comprises training a machine-learning model with a location training dataset, wherein the location training dataset comprises location information that indicates whether a move from the first location to the second location should cause the configuring of the client computing device; and, wherein determining whether the client computing device has permanently moved from a first location to a second location comprises determining a probability value that the client computing device has permanently moved from the first location to the second location based on location information obtained from the client computing device and input to the machine-learning model, and comparing the determined probability value with a probability value threshold that indicates a likelihood that the client computing device has permanently moved.

In yet a further embodiment of the system, the machine-learning model is updated with additional location information based on feedback that the determined probability value is incorrect.

In another embodiment of the system, the plurality of operations further comprises restoring auxiliary copy data from the second secondary data location after the determination that the determined probability value is greater than the probability value threshold.

In a further embodiment of the system, the plurality of operations further comprises determining whether there is a difference in the auxiliary copy data and the secondary copy data, and wherein the synchronizing of the auxiliary copy data and the secondary copy data is based on a determined difference in the auxiliary copy data and the secondary copy data.

This disclosure further provides for a non-transitory, computer-readable medium having computer-executable instructions stored thereon that, when executed by one or more processors, cause a system to perform a plurality of operations. The plurality of operations comprises synchronizing secondary copy data stored at a first secondary data location to a first auxiliary data location to obtain auxiliary copy data from the secondary copy data, wherein the secondary copy data is backed up from primary data stored at a client computing device, and determining whether the client computing device has permanently moved from a first location to a second location, wherein the first location is associated with the first secondary data location and the second location is associated with the first auxiliary data location. The plurality of operations also comprises, in response to the determination that the client computing device has permanently moved from the first location to the second location, designating the first auxiliary data location as a second secondary data location; and, designating the first secondary data location as a second auxiliary data location. The plurality of operations also comprises, configuring the client computing device to back up primary data to the second secondary data location, and backing up the primary data stored at the client computing device to the second secondary data location to obtain updated secondary copy data.

In another embodiment of the non-transitory, computer-readable medium, the determining whether the client computing device has permanently moved from the first location to the second location is based on location information obtained from the client computing device.

In a further embodiment of the non-transitory, computer-readable medium of claim 16, the location information comprises a first set of Global Positioning System (GPS) coordinates associated with the first location and a second set of GPS coordinates associated with the second location.

In yet another embodiment of the non-transitory, computer-readable medium, the plurality of operations further comprises training a machine-learning model with a location training dataset, wherein the location training dataset comprises location information that indicates whether a move from the first location to the second location should cause the configuring of the client computing device, and, wherein determining whether the client computing device has permanently moved from a first location to a second location comprises determining a probability value that the client computing device has permanently moved from the first location to the second location based on location information obtained from the client computing device and input to the machine-learning model, and comparing the determined probability value with a probability value threshold that indicates a likelihood that the client computing device has permanently moved.

In yet a further embodiment of the non-transitory, computer-readable medium, the machine-learning model is updated with additional location information based on feedback that the determined probability value is incorrect.

In another embodiment of the non-transitory, computer-readable medium, the plurality of operations further comprises restoring auxiliary copy data from the second secondary data location after the determination that the determined probability value is greater than the probability value threshold.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method for managing an auxiliary data location and a secondary data location, the method comprising:
    according to information management policy assigned to a client computing device, synchronizing secondary copy data stored at a first secondary data location to a first auxiliary data location to obtain auxiliary copy data from the secondary copy data,
        wherein the secondary copy data is backed up from primary data stored at the client computing device,
        wherein the information management policy is a collection of preferences or settings for performing data management operations on production data assigned to the information management policy and on secondary copies of the production data;
    determining whether the client computing device has permanently moved from a first location to a second location, wherein:
        the determining whether the client computing device has permanently moved from the first location to the second location comprises:
            determining a probability value that the client computing device has permanently moved from the first location to the second location based on location information obtained from the client computing device,
            comparing the determined probability value with a probability threshold value that indicates a likelihood that the client computing device has permanently moved,
            wherein the first location is associated with the first secondary data location and the second location is associated with the first auxiliary data location;
    in response to the determination that the client computing device has permanently moved from the first location to the second location:
        designating the first auxiliary data location as a second secondary data location, and
        designating the first secondary data location as a second auxiliary data location;
    configuring the client computing device to back up the primary data to the second secondary data location; and
    backing up the primary data stored at the client computing device to the second secondary data location to obtain updated secondary copy data.

2. The method of claim 1, wherein the location information obtained from the client computing device comprises private location information.

3. The method of claim 2, wherein the location information comprises a first set of Global Positioning System (GPS) coordinates associated with the first location and a second set of GPS coordinates associated with the second location.

4. The method of claim 1, wherein determining the probability value that the client computing device has permanently moved from the first location to the second location based is also based, at least in part, on output of a machine-learning model.

5. The method of claim 4, wherein:
    the machine-learning model was previously trained with a location training dataset, and
    the location training dataset comprises location information that indicates whether a move from the first location to the second location should cause the client computing device to back up the primary data to a second secondary data location.

6. The method of claim 4, wherein, based on feedback that the determined probability value is incorrect, the machine-learning model is updated with the location information obtained from the client computing device.

7. The method of claim 1, further comprising:
    restoring auxiliary copy data from the second secondary data location after the determination that the determined probability value is greater than the probability value threshold.

8. The method of claim 1, further comprising:
    determining whether there is a difference in the auxiliary copy data and the secondary copy data, and wherein the synchronizing of the auxiliary copy data and the secondary copy data is based on a determined difference in the auxiliary copy data and the secondary copy data.

9. A system for managing an auxiliary data location and a secondary data location, the system comprising:
    one or more non-transitory, computer-readable media having computer-executable instructions stored thereon; and,
    one or more processors that, having executed the computer-executable instructions, configure the system to perform a plurality of operations comprising:
        according to information management policy assigned to a client computing device, synchronize secondary copy data stored at a first secondary data location to a first auxiliary data location to obtain auxiliary copy data from the secondary copy data,
            wherein the secondary copy data is backed up from primary data stored at the client computing device,
            wherein the information management policy is a collection of preferences or settings for performing data management operations on production data assigned to the information management policy and on secondary copies of the production data;
        determining whether the client computing device has permanently moved from a first location to a second location, wherein the first location is associated with the first secondary data location and the second location is associated with the first auxiliary data location, wherein:
            the determining whether the client computing device has permanently moved from the first location to the second location comprises:
                determining a probability value that the client computing device has permanently moved from the first location to the second location based on location information obtained from the client computing device,
                comparing the determined probability value with a probability threshold value that indicates a likelihood that the client computing device has permanently moved;

in response to the determination that the client computing device has permanently moved from the first location to the second location:
designating the first auxiliary data location as a second secondary data location; and
designating the first secondary data location as a second auxiliary data location;
configuring the client computing device to back up primary data to the second secondary data location; and
backing up the primary data stored at the client computing device to the second secondary data location to obtain updated secondary copy data.

10. The system of claim 9, wherein the location information obtained from the client computing device comprises private location information.

11. The system of claim 10, wherein the location information comprises a first set of Global Positioning System (GPS) coordinates associated with the first location and a second set of GPS coordinates associated with the second location.

12. The system of claim 9, wherein determining the probability value that the client computing device has permanently moved from the first location to the second location based is also based, at least in part, on output of a machine-learning model.

13. The system of claim 12, wherein the machine-learning model was previously trained with a location training dataset, and wherein the location training dataset comprises location information that indicates whether a move from the first location to the second location should cause the client computing device to back up the primary data to a second secondary data location.

14. The system of claim 12, wherein, based on feedback that the determined probability value is incorrect, the machine-learning model is updated with the location information obtained from the client computing device.

15. The system of claim 9, wherein the plurality of operations further comprises:
restoring auxiliary copy data from the second secondary data location after the determination that the determined probability value is greater than the probability value threshold.

16. The system of claim 9, wherein the plurality of operations further comprises:
determining whether there is a difference in the auxiliary copy data and the secondary copy data, and wherein the synchronizing of the auxiliary copy data and the secondary copy data is based on a determined difference in the auxiliary copy data and the secondary copy data.

17. A non-transitory, computer-readable medium having computer-executable instructions stored thereon that, when executed by one or more processors, cause a system to perform a plurality of operations comprising:
according to information management policy assigned to a client computing device, synchronizing secondary copy data stored at a first secondary data location to a first auxiliary data location to obtain auxiliary copy data from the secondary copy data,
wherein the secondary copy data is backed up from primary data stored at the client computing device,
wherein the information management policy is a collection of preferences or settings for performing data management operations on production data assigned to the information management policy and on secondary copies of the production data;
determining whether the client computing device has permanently moved from a first location to a second location, wherein the first location is associated with the first secondary data location and the second location is associated with the first auxiliary data location, wherein:
the determining whether the client computing device has permanently moved from the first location to the second location comprises:
determining a probability value that the client computing device has permanently moved from the first location to the second location based on location information obtained from the client computing device, and
comparing the determined probability value with a probability threshold value that indicates a likelihood that the client computing device has permanently moved;
in response to the determination that the client computing device has permanently moved from the first location to the second location:
designating the first auxiliary data location as a second secondary data location, and,
designating the first secondary data location as a second auxiliary data location;
configuring the client computing device to back up primary data to the second secondary data location; and,
backing up the primary data stored at the client computing device to the second secondary data location to obtain updated secondary copy data.

18. The non-transitory, computer-readable medium of claim 17, wherein determining the probability value that the client computing device has permanently moved from the first location to the second location based is also based, at least in part, on output of a machine-learning model.

19. The non-transitory, computer-readable medium of claim 18, wherein the machine-learning model was previously trained with a location training dataset, and wherein the location training dataset comprises location information that indicates whether a move from the first location to the second location should cause the client computing device to back up the primary data to a second secondary data location.

20. The non-transitory, computer-readable medium of claim 18, wherein, based on feedback that the determined probability value is incorrect, the machine-learning model is updated with the location information obtained from the client computing device.

21. The non-transitory, computer-readable medium of claim 17, wherein the plurality of operations further comprises:
restoring auxiliary copy data from the second secondary data location after the determination that the determined probability value is greater than the probability value threshold.

22. The non-transitory, computer-readable medium of claim 17, further comprising determining whether there is a difference in the auxiliary copy data and the secondary copy data, and wherein the synchronizing of the auxiliary copy data and the secondary copy data is based on a determined difference in the auxiliary copy data and the secondary copy data.

* * * * *